United States Patent [19]

Nakamura et al.

[11] 4,047,194
[45] Sept. 6, 1977

[54] CAMERA SYSTEM WITH MEANS FOR AUTOMATICALLY SWITCHING TO FLASH OPERATION

[75] Inventors: Zenzo Nakamura, Urawa; Takashi Uchiyama, Yokohama; Masanori Uchidoi; Tetsuya Taguchi, both of Kawasaki; Hiroshi Aizawa, Machida; Tokuichi Tsunekawa, Yokohama, all of Japan

[73] Assignee: Canon Kabushiki Kaisha, Tokyo, Japan

[21] Appl. No.: 575,002

[22] Filed: May 6, 1975

[30] Foreign Application Priority Data

| May 8, 1974 | Japan | 49-50916 |
| May 20, 1974 | Japan | 49-56275 |
| May 20, 1974 | Japan | 49-56276 |
| May 20, 1974 | Japan | 49-56277 |
| May 20, 1974 | Japan | 49-56278 |
| May 20, 1974 | Japan | 49-56279 |
| May 20, 1974 | Japan | 49-56280 |
| July 12, 1974 | Japan | 49-80009 |
| July 17, 1974 | Japan | 49-83060 |
| July 18, 1974 | Japan | 49-82462 |
| July 27, 1974 | Japan | 49-86371 |
| Sept. 26, 1976 | Japan | 49-111288 |

[51] Int. Cl.² .................................... G03B 15/05
[52] U.S. Cl. ........................... 354/149; 354/27; 354/33; 354/145
[58] Field of Search ............. 354/27, 29, 30, 32, 354/33, 35, 149, 145

[56] References Cited

U.S. PATENT DOCUMENTS

| 3,535,989 | 10/1970 | Kitai | 354/32 |
| 3,611,902 | 10/1971 | Kitai | 354/33 |
| 3,624,725 | 11/1971 | Kobayashi | 354/30 |
| 3,638,543 | 2/1972 | Kondo | 354/35 |
| 3,643,564 | 2/1972 | Uchiyama | 354/33 X |
| 3,675,547 | 7/1972 | Uchiyama et al. | 354/33 X |
| 3,688,661 | 9/1972 | Engelsmann | 354/35 |
| 3,688,664 | 9/1972 | Mashimo | 354/33 |
| 3,742,828 | 7/1973 | Nakajima et al. | 354/33 |
| 3,750,550 | 8/1973 | Kasemeier et al. | 354/33 |
| 3,779,142 | 12/1973 | Yata et al. | 354/32 X |
| 3,919,593 | 11/1975 | Nakamura | 354/145 X |

Primary Examiner—Edna M. O'Connor
Attorney, Agent, or Firm—Toren, McGeady and Stanger

[57] ABSTRACT

A camera system is composed of a flash and a camera in which the diaphragm and shutter time control as well as the indicating mechanism are automatically switched into a flash mode in response to the charge accumulation completion signal from the electronic flash discharge device.

27 Claims, 18 Drawing Figures

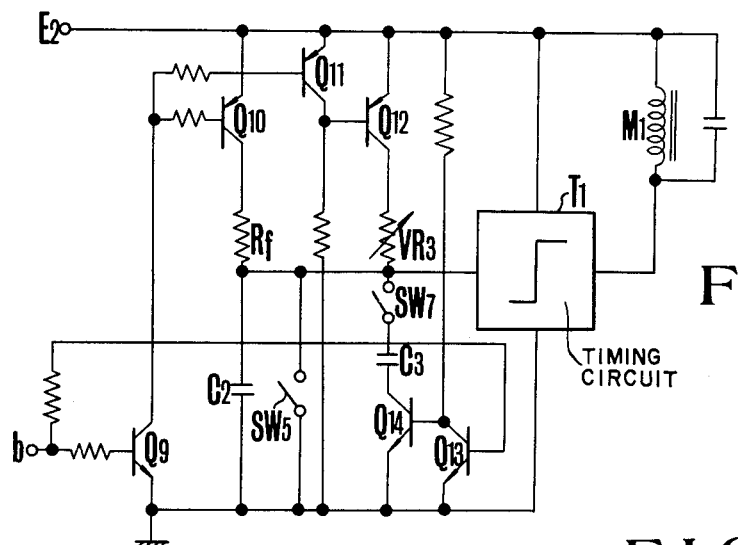
FIG.7
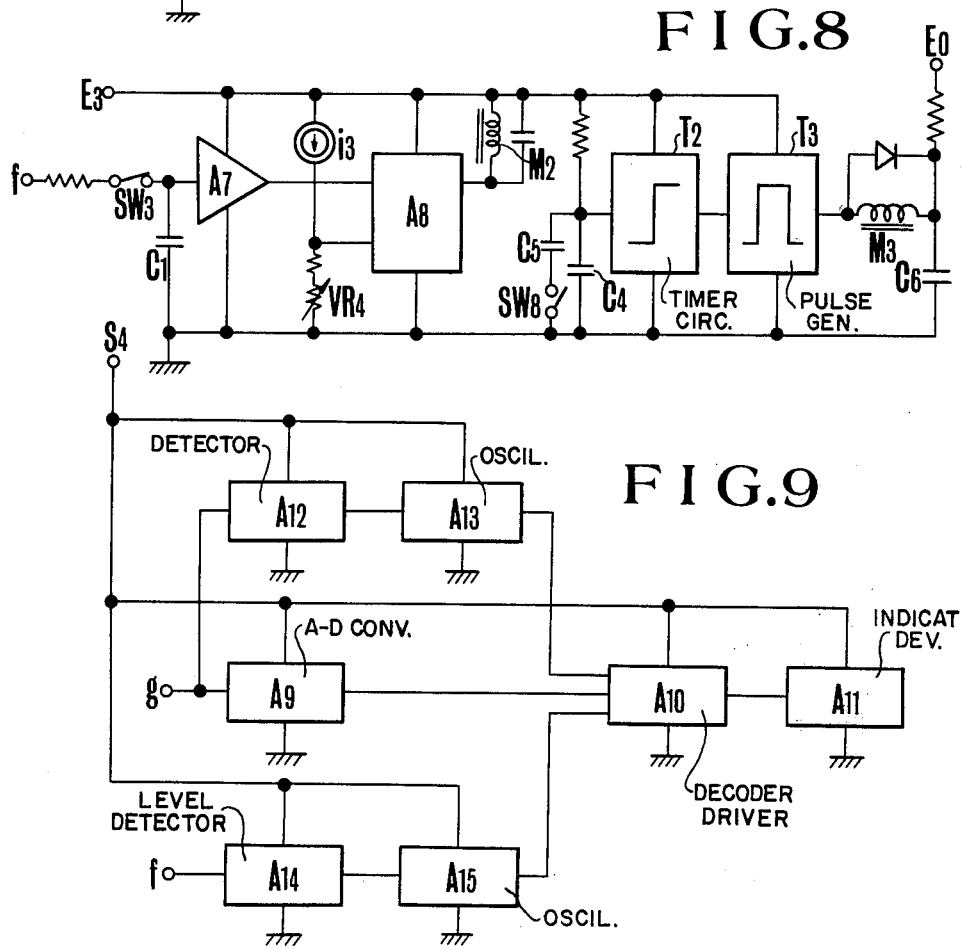
FIG.8
FIG.9

CAMERA SYSTEM WITH MEANS FOR AUTOMATICALLY SWITCHING TO FLASH OPERATION

BACKGROUND OF THE INVENTION

1. Field of the Invention

The present invntion relates to a camera system and a flash light device for flash photography by using a flash light device.

2. Description of the Prior Art

A conventional camera is set for flash operation by manually adjusting the shutter to a time appropriate for flash photography while setting the diaphragm for the light appropriate to the flash. Moreover, an additional manual operation is necessary for disabling any daylight automatic exposure control system as well as indicating system of the camera. Thus such conventional cameras present a number of inconveniences which stand in the way of obtaining good flash pictures. They also may cause the photographer to miss pictures because he forgot one of the many complicated manual operations which are needed.

When a flash system is used, an operator reads out the value designated by an exposure calculator plate on the flash device and manually sets the camera's diaphragm. A proper exposure is difficult even with a light sensing electronic flash if the camera's diaphragm is set at an improper value. This is so because the electronic flash operates on the basis of light striking a light sensing element in the flash and is unable to accommodate itself for different aperture settings. More specifically, the electronic flash assumes a predetermined diaphragm aperture to produce sufficient light for a proper exposure. Thus it is necessary to preset the diaphragm at a predetermined aperture. Furthermore, it is necessary to take changes in film sensitivity into consideration by varying the aperture value. Moreover, it is necessary to preset the shutter speed at a predetermined value, such as 1/60th of a second, prior to operating the flash. All these requirements are inconvenient.

As a further point, before operating in the flash mode, it is necessary to determine whether the main flash capacitor has charged to its required level. Also, the photographer must confirm whether the photograph has been taken with the flash and whether the photograph has been taken under the proper exposure conditions. Thus a photographer is bothered by complicated maneuvers and the need to confirm proper operation.

SUMMARY OF THE PRESENT INVENTION

The purpose of the present invention is to offer a camera system according to which the aperture of the camera is automatically set at a certain designated diaphragm value at taking a flash light photograph.

Further another purpose of the present invention is to offer a camera system according to which the shutter time is automatically set at a certain predetermined value at taking a flash light photograph.

Further another purpose of the present invention is to offer a camera system according to which it is indicated whether the conditions for obtaining the proper exposure exist at taking a flash light photograph.

Further another purpose of the present invention is to offer a camera system according to which the following operations are automatically operated, namely;

1. the operation of the flash light device is confirmed by the fact that the lump for indicating the completion of charge in the view finder of the camera is lighted up and extinguished when the flash light device operates for taking a flash light photograph,
2. the automatic exposure control device as well as the indication device for taking photograph under day light is switched over so as not to response to the output information of the light sensing device but to response to the output information coming from the flash light device, and
3. the shutter time control circuit of the camera is switched over to the constant shutter time circuit for obtaining the shutter proper for taking flash light photograph, and so on.

further other purposes of the present invention will be disclosed in the following explanation made in accordance with the accompanying drawings.

BRIEF DESCRIPTION OF THE DRAWINGS

FIG. 7 shows a circuit diagram of an embodiment of the second circuit part in FIG. 5.

FIG. 8 shows a circuit diagram of an embodiment of the third circuit part in FIG. 5.

FIG. 9 shows a circuit diagram of an embodiment of the fourth circuit part in FIG. 5.

DESCRIPTION OF THE EMBODIMENTS OF THE INVENTION

Figure 1:
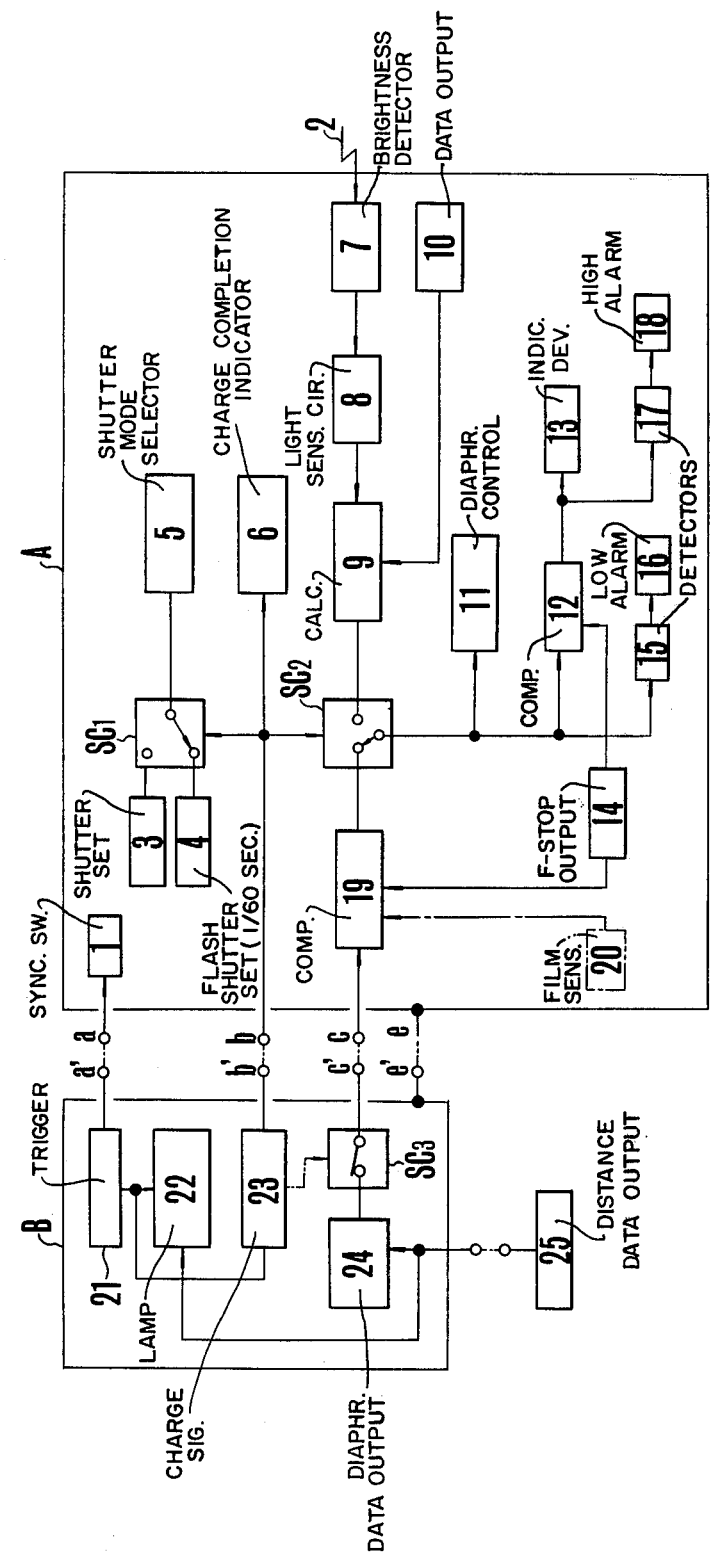
FIG. 1 shows a circuit diagram of an embodiment of the camera system in accordance with the present invention.

In the camera system embodying the invention as shown in FIG. 1, a camera body A is connected to an electronic flash (electronic flash device) by suitable cords or accessory shoe contacts which connect camera terminals $a$, $b$, $c$, and $e$ to flash terminals $a'$, $b'$, $c'$, and $e'$. Selector switches $SC_1$, $SC_2$, and $SC_3$ respond to completion of charging of the electronic flash. In the camera body A, a synchronizing switch 1 closes in synchronism with the camera shutter. The switch 1 can be either a conventional mechanical switch with contacts or a semiconductor switch. A shutter time setting device 3 may be in the form of a variable resistor in engagement with a shutter dial. A constant shutter time setting device 4 sets the shutter to operate at a predetermined shutter time suitable for flash operation, for example, 1/60th of a second. A mode selector or a shutter time control 5 selects the shutter time mode established by the shutter setting device 3 or 4. A charge completion indicator and operates only when the electronic flash is ready for operation. 7 The object's brightness detecting device is composed of a photoelectric converting element, which receives the light coming from the object to be photographed through a photographic lens so as to produce information concerning the object brightness influenced by the F-value of the totally opened lens. A light sensing circuit 8 may for example have logarithmic compression characteristics and producing the above mentioned information compressed at its output. A calculator 9 receives the information coming from the information output device 10 set in functional engagement with the shutter dial, the film sensitivity dial, the F-value of the totally opened lens and the like beside the information coming from circuit 8. Light sensing compensation data for a totally opened lens is set at 10 as the diaphragm information. These data are processed in 9, at whose output a signal for indicating the step number of the diaphragm of the photographic lens for obtaining a proper exposure is produced.

A diaphragm control device the aperture of the photographic lens in accordance with the signal of the diaphragm step number from the selector switch $SC_2$. Members 12 and 13 are a computor and an indicating device for indicating the information of the absolute diaphragm value obtained from the signal of an F-value information output device 14 set in functional engagement with the F-value signal member of the photographic lens and the signal of the step number of diaphragm. When the step number signal applied to a detector 15 is insufficient, a low alarm 16 operates so as to indicate an insufficient exposure even with a totally opened photographic lens. When the absolute diaphragm value signal applied to a detector 17 is too high a high alarm 18 operates so as to indicate excessive exposure even at its photographic lens with the smallest diaphragm value.

A computor 19 serves for processing and converting the absolute diaphragm value signal applied from the flash light device through the terminals $c'$ and $c$ and the fully opened F-value signal from 14 into the signal of the step number of the diaphragm. When the selector switch $SC_2$ is switched over to the computer 19, members 11 to 18 operate in accordance with the signal from computer 19 in such a manner that the above mentioned devices at the camera A are operated in accordance with the flash B. Member 20 shown in dotted line in the drawing is the film sensitivity information device. It is necessary to add the film sensitivity information to the signal delivered from the flash B to computer 19 when the signal does not contain this information.

In the flash light device B, 21 is the trigger device for the discharging tube, and is connected with the synchronizing switch 1 at the camera A by means of the terminals $a'$, $a$. It produces a trigger signal when switch 1 is closed, so as to actuate the illuminating device 22.

A main capacitor charge completion signaler 23 supplies a charge completion signal to the camera through the terminals $b'$ and $b$ in synchronism with the lighting of an indicator such as a neon tube. A diaphragm data, or information, output device produces an absolute value diaphragm signal to which the aperture of the photographic lens is set, and which value is determined in accordance with the characteristics of the flash device, the selected operating mode, the distance of the object to be photographed, etc. A switch $SC_3$ delivers the signal at the output device 24 to the computer 19 through terminals $c'$ and $c$.

According to an embodiment of the invention, the film sensitivity information device 20 is not provided in the camera. In that case, the film sensitivity is set in the output device 24.

A distance information output device 25 is, according to one embodiment of the invention formed integrally as part of the flash device B. According to another embodiment of the invention the device 25 is separate from the flash device B as shown in the drawings. The device 25 is formed of a light sensing element for sensing the flash light reflected by the object to be photographed and serves to terminate the light output of the illuminating device 22 as soon as an integral value reaches a predetermined value. According to another embodiment of the invention, the device 25 is in the form of a variable resistor coupled to the focus adjustment of the objective lens so as to control the light output of the flash 22 or to transmit a signal as shown by the dotted line in FIG. 1, to the device 24 in accordance with the distance. This produces the desired diaphragm data to be determined by the distance and illumination. According to another embodiment of the invention, the charge completion signal controls the switch $SC_3$ as shown by the dotted line in FIG. 1. A cable connects the terminal $e'$ in the flash device with the terminal $e$ in the camera A.

The device in FIG. 1 operates as follows

When the flash B is not mounted on the camera or when charging is not yet completed although the flash light device B is mounted on the camera, or when a photograph is taken in day light, the charge completion signal is not delivered from the flash light device B to the camera A through the terminal $b$. Thus the switches $SC_1$ and $SC_2$ are turned to the sides opposite to those shown in the drawing. Therefore, when the shutter time is set by shutter setting device 3 and the shutter is released, the shutter operates with the desired shutter time by members 3 and 5. At the same time the diaphragm control device 11 operates in accordance with the diaphragm signal from members 7 to 10 so as to control the aperture of the photographic lens for a proper exposure. The indicating device indicates the aperture of the diaphragm. When this diaphragm value goes out of the range in which the aperture of the photographic lens can be set, either the low alarm device 16 or the high alarm device 18 operates. Thus it is possible for the photographer to alter the setting of the shutter in order to take the photograph within the settable range of diaphragm.

In case the flash light device B is mounted on the camera A and is ready for taking a flash photograph, a signal from the charge completion signal output device 23 of the flash light device B actuates the charge completion indication device 6 in the view finder to let the photographer know that the flash light device B is ready for operation. Further, the switch over devices $SC_1$ and $SC_2$ are positioned as is shown in the drawing. Also the shutter time is set at 1/60 sec. for example by the constant shutter time setting device 4. The shutter time is led to the shutter time control device 5 through SC₁ in such a manner that the shutter operates with the shutter time suited for taking the flash light photograph. On the other hand, the diaphragm control device 11, the diaphragm indication device 13 and the alarm devices 16, 18 are all operated by the output signal of the diaphragm information output device 24 provided in the flash light device B, so as to carry out the diaphragm control suited for taking the flash light photograph, the indication and the alarm. The synchronizing switch 1 operates in synchronism with the operation of the shutter in response to the shutter release operation. The shutter time is set for taking a flash light photograph. The flash light device is actuated by the switch 1 in such a manner that the light amount is controlled in accordance with the distance of the object to be photographed so as to obtain a proper exposure. As soon as the flash device operates, the charge completion signal of 23 stops and therefore regardless of the illumination amount the above mentioned indication device is brought out of operation more than a certain determined time so that it is possible to confirm in the view finder that the flash light device has operated. As explained above, the device shown in FIG. 1 presents all functions such as the indication of the charge completion and the indication of the operation of the flash light device, the automatic switching over of the circuits and the functional engagement of the diaphragm as well as the switching over of the shutter time.

Figure 2:
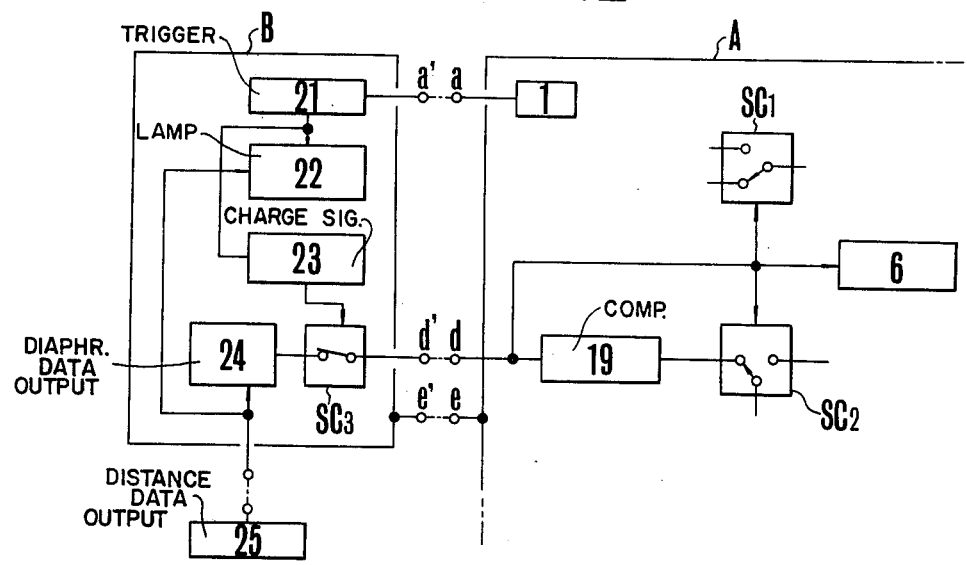
FIGS. 2, 3 and 4 show circuit diagrams of other embodiments of the camera system in accordance with the present invention.
Figure 3:
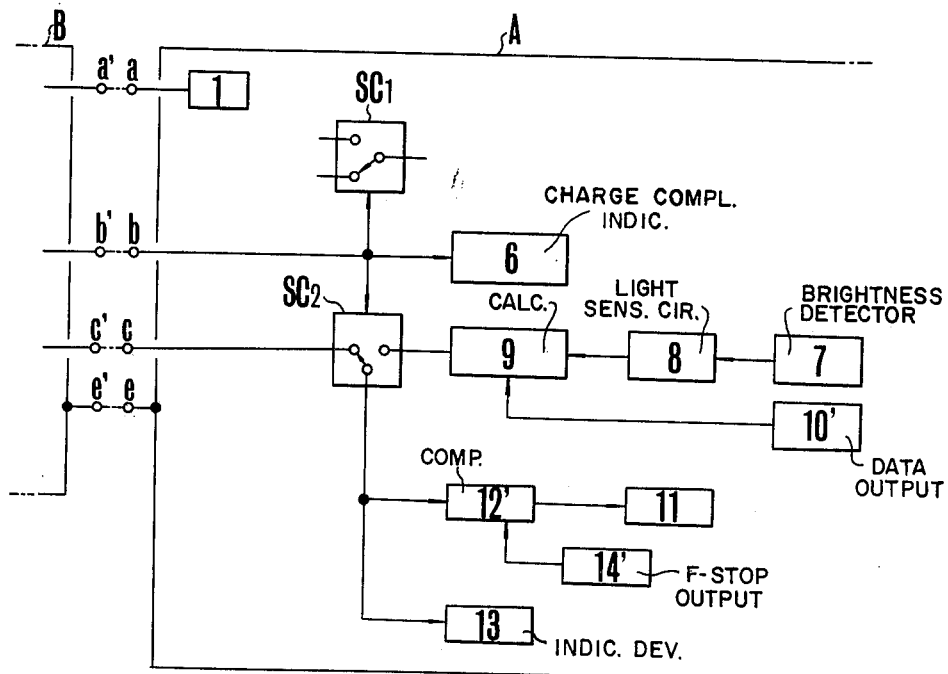
Figure 4:
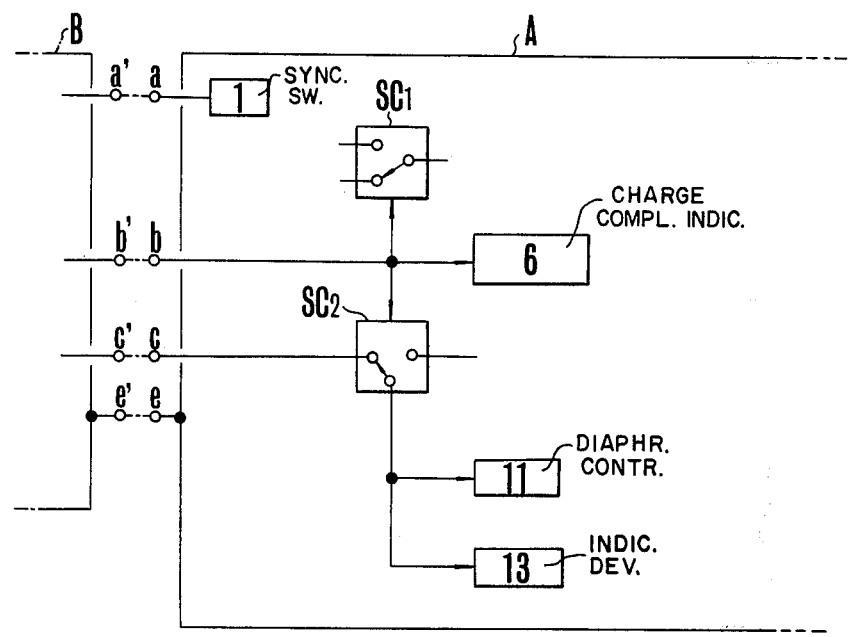

FIGS. 2, 3 and 4 show circuit diagrams of other embodiment of the present invention, whereby the same parts as those shown in FIG. 1 present the same figures. FIG. 2 shows an embodiment in which the number of the connecting terminals between the flash light device B and the camera body A is reduced in such a manner that the terminals b, b' and c, c' are made into common terminals d, d'. In case of this device the output of the charge completion signal output device 23 of the flash light device B is led to the camera A by means of the switching over device SC₃ provided in the flash light device B through the terminals d', d. Therefore, at the camera the signal coming through the terminal d is divided into two, namely the one for the computor 19 and the other for the charge completion indication means and at the same time for controlling the switching over devices SC₁ and SC₂. Without the charge completion signal SC₃ is in the switched off state so that the diaphragm information signal from 24 is not delivered to the camera. The diaphragm information is delivered to the camera only after the charging has been completed. Other circuit compositions are same as for the embodiment shown in FIG. 1.

In the embodiment shown in FIG. 3, the flash light device B is same as that shown in FIG. 1, while the method of the introduction of information in the camera A differs. Namely, the information output device 10' produces an information which is the sum of the information of 10 in FIG. 1 and of the information of 14, namely the information corresponding to the fully opened F-value. Thus, the output of the computing device 9 is the absolute diaphragm value signal which directly operates the indication device 13 to indicate the diaphragm value while to the diaphragm control device 11, an output which is converted into the diaphragm step number signal by means of the computor 12' is delivered. Namely, the output of the fully opened F-value information output device 14' is led to the above mentioned computor 12' which produces the diaphragm step number signal. Hereby in the drawing the alarm devices (15 – 18 in FIG. 1), the computor 19 and the film sensitivity information device 20 are omitted, but it is natural that such corresponding to those can be provided.

FIG. 4 shows a variation of the circuit of an embodiment in which a lens with absolute value system is used as lens to be mounted on the camera. The so called lens with absolute value is so designed that the signal member for functionally engaging the preset diaphragm member, or the diaphragm member directly connected with diaphragm blades with the control member at the camera side is positioned always at a certain predetermined position for a certain diaphragm value regardless of the F-value of the fully opened lens, whereby in order to control the aperture of such type of lens from the camera side it is sufficient to send also to the diaphragm control device 11 as shown in the drawing the absolute diaphragm value information, as is the case with the indication device 13.

Other compositions of the circuit are same as those of the embodiment shown in FIG. 3 so that they are omitted in the drawing.

The circuit diagrams for showing the details of each part of the so far explained embodiment are shown in FIGS. 5 to 10.

Figure 5:
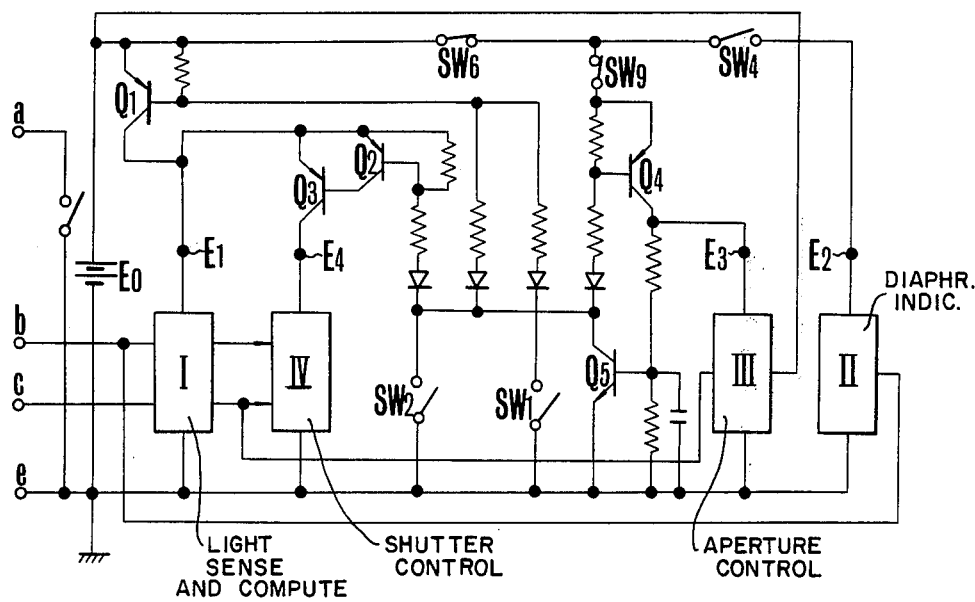
FIG. 5 shows a circuit diagram for explaining the operation at camera side in the embodiment shown in FIG. 1, namely an embodiment of the current supply system in accordance with the present invention.

FIG. 5 shows a circuit diagram for explaining the current supply circuit for the devices at the camera side. In the drawing, Eo is the current source of the camera, from which current is supplied to the circuit I, II, III and IV. I is the first circuit part which carries out the light sensing and the computation for taking photograph under day light and the computation in accordance with the input information from the flash light device and the charge completion indication for taking photograph under flash light, being automatically switched over into the state for taking photograph under flash light only when the charge completion signal is put in the circuit from the flash light device. II is the second circuit part which controls the shutter mechanism in accordance with the shutter time set on the shutter time setting dial when taking photograph under day light but is automatically switched over so as to control the shutter mechanism with the shutter time (for example 1/60 sec.) suited for taking photograph when taking photograph under flash light. III is the third circuit part for setting the aperture of the photographic lens at the determined diaphragm value for taking photograph under day light as well as under flash light in accordance with the input from the first circuit part I, consisting of the circuit for controlling the raising time of the mirror and the electronic self-timer circuit. IV is the fourth circuit part which indicates the diaphragm value set in accordance with the input from the first circuit part I when taking photograph under day light as well as under flash light and alarms when the photographic conditions of the object to be photographed are outside of the settable range. The informations to be put in the circuits at the camera side from outside are the information from the flash light device, the information of the brightness of the object to be photographed from the light sensing element, the manually set sensitivity information of the film, and the shutter time informations and so on.

Below the operation of the device in accordance with the present invention will be explained in accordance with the circuit shown in FIG. 5. When the switch SW₁ is closed at the first step of the shutter release operation, the transistors $Q_1$, $Q_3$ are switched on so that the current is supplied to the first and the fourth circuits from the current source $E_o$. Thus the first circuit I delivers to the fourth circuit IV, an output corresponding to the brightness of the object to be photographed or to the information from the flash light device. Hereby the determined diaphragm value is indicated and when the value is outside of the settable range, the alarm is indicated. When then the switch $SW_2$ is closed at the second step of the shutter release, the transistor $Q_3$ is opened in such a manner that the current supply to the fourth circuit is interrupted while the transistor $Q_4$ is closed in such a manner that the current is supplied to the third circuit III by means of the switches $SW_6$ and $SW_9$. Thus the magnet not shown in the drawing, in the tensing circuit of the third circuit III operates so as to start to raise the mirror not shown in the drawing. The switch $SW_4$ is closed during the upward movement of the mirror in such a manner that the current is supplied to the second circuit II. About at this time, the diaphragm control magnet in the third circuit III operates in such a manner that the aperture of the photographic lens is set at the determined diaphragm value in accordance with the input from the first circuit I. After the upward movement of the above mentioned mirror and the completion of the diaphragm setting, the front plane of the focal plane shutter starts to run, while at the same time, the time count starting switch is closed and the second circuit II ready for operation starts to operate in such a manner after elapse of a certain determined time the magnet for controlling the rear plane of the focal plane shutter is operated so as to close the rear plane to complete the exposure. After then a series of already known operations such as the downward operation of the mirror and so on takes place, whereby during the downward operation of the mirror the switch $SW_4$ is opened. Hereby $SW_6$ is the switch for preventing erroneous operation which closes at the termination of the film winding up and opens at the start of the rear plane of the focal plane shutter, which $SW_9$ is the current economizing switch which opens after the running of the front plane and closes immediately after the start of the winding up operation. After the termination of the exposure in case of FIG. 1, the film winding up operation is carried out manually or by means of a motor driven device in such a manner that all the mechanisms assume the initial state such as the charged shutter mechanism and so on.

In the above mentioned operation, the aperture set by means of the third circuit part III and the shutter time to be controlled by means of the second circuit part II are the aperture and the shutter time for taking photograph under flash light when a flash light device is mounted on the terminal $a - e$ and is ready for operation, whereby the flash light device is operated by means of a synchronizing switch closing synchronized with the operation of the shutter. Further even in case the magnet in the tensing circuit of the third circuit part III has been operated, the mechanisms such as mirror have started operation and the finer of the photographer has left the shutter button, the output information of the first circuit part I is still stored while by means of the self-holding circuit such as condensors inserted in the base of $Q_5$ the transistors $Q_4$, $Q_5$ are kept in the switched on state even if the $SW_2$ is opened so that an accurate operation can be carried out. In case of the second circuit part II, the current is kept to be supplied by means of the switches $SW_6$ and $SW_4$ until the termination of the operation.

Figure 6:
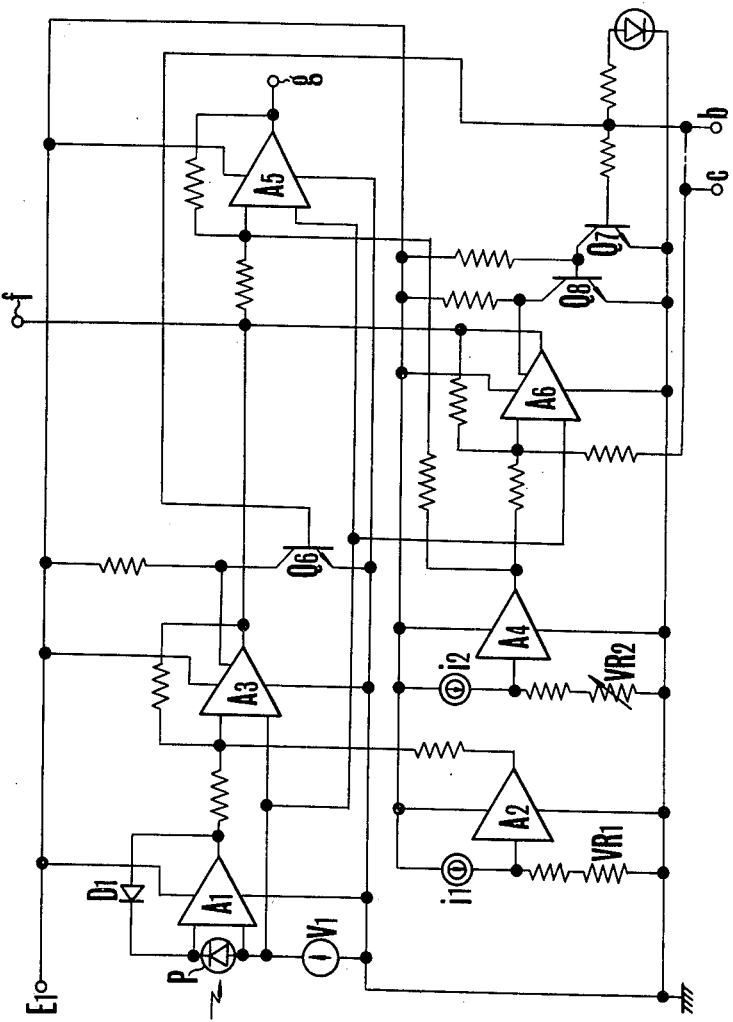
FIG. 6 shows a circuit diagram of an embodiment of the first circuit part in FIG. 5.

FIGS. 6 and 9 respectively shown the detailed circuit diagrams of the first, the second, the third and the fourth circuit part shown in FIG. 5. In FIG. 6, P is the light sensing element, for example, a photoelectric converting element such as silicone blue cell being arranged in the view finder optical system of TTL system. $A_1$ is the amplifier (for example processing amplifier) in the light sensing circuit, in whose feed back circuit a logarithmic diode $D_1$ is connected is such a manner that a logarithmically compressed output is obtained. $A_2$ is the amplifier in the photographic information setting circuit, to whose input a variable resistance $VR_1$ is connected on which resistance the film sensitivity, the shutter time as well as the compensation due to the TTL totally opened light sensing system are set while the output of $A_2$ is put in the amplifier $A_3$ of the processing circuit, being composed with the output of $A_1$. The above mentioned various informations are processed in the processing amplifier $A_3$, so as to produce the diaphragm information at the output terminal $f$. This diaphragm information is put in the diaphragm control circuit shown with III in FIG. 5. The output of A' is put in the second processing amplifier $A_5$, being composed with the output of the amplifier $A_4$ of the second information setting circuit to whose input a variable resistance $VR_2$ is connected, on which resistance the F-value of the totally opened photographic lens is set, in such a manner that a signal corresponding to the absolute diaphragm value is produced at the output terminal $g$. $A_6$ is the processing amplifier operating at the time of taking photograph under flash light, whereby $Q_6$, $Q_7$ and $Q_9$ are the switching transistors being reversed by means of the charge completion signal supplied from the flash light device through the terminal $b$, being intended to close respectively open the biases of $A_3$ and $A_6$. $L_1$ is the illuminating diode or the lamp arranged at a proper position in the view finder optical path, lighting at the completion of the charge of the flash light device so as to indicate to the photographer that the flash light device is ready for operation.

The operation of the circuit shown in FIG. 6 is as follows. In case the flash light device is not connected to the circuit or even if the flash light device is connected to the circuit the charge has not yet been completed, no voltage is applied to the input terminal $b$ which is connected with the flash light device so that by means of the effect of the bias control transistor $Q_6$, $Q_7$ and $Q_8$ the processing amplifier $A_3$ is kept in the operation state and the processing amplifier $A_6$ out of the operation state. Thus by means of the information relative to the brightness of the object to be photographed, being put in the light sensing element P an automatic exposure with the priority on the shutter time is controlled. In case of the TTL totally opened light sensing the light amount entering into P assumes the composed value of the brightness (B$\nu$) of the object to be photographed, the F-value (A$\nu o$) of the totally opened photographic lens and the curving (A$\nu c$) taking place when the lens of the light sensing optical system is especially bright. Thus at the output of the processing amplifier $A_1$ presenting the compression characteristics the information is produced in form of Apex value (B$\nu$ — A$\nu o$ — A$\nu c$). Further on VR connected with $A_2$, the film sensitivity (S$\nu$), the shutter time (T$\nu$) and the compensation for the curving (A$\nu c$) put in by means of the compensation pin of the photographic lens are set so that at the output of $A_2$ their composed value ($Sv + Avc - Tv$) is produced. The output of $A_1$ and that of $A_2$ are put in the processing amplifier $A_3$, being composed, while at the output of $A_3$ the information ($Bv + Sv - Tv - Avo$) is produced. This information assumes the value ($Av - Avo$) and the diaphragm step number signal showing how many step number the diaphragm is to be closed from the F-value of the totally opened lens. On the other hand, the information ($Avo$) of the F-value of the totally opened lens set on $VR_2$ is produced through the amplifier $A_4$ and put in the processing amplifier $A_5$, being composed with the output ($Av - Avo$) of $A_3$ so that the absolute diaphragm value information ($Av$) is produced at the output terminal of $A_5$. This $Av$ is produced at the output terminal $g$ and put in the indication, alarm circuit. When then the flash light device is ready for operation, the charge completion signal from the flash light device is put in the terminal $b$ whereby by means of the effect of the transistor for switching over $A_3$ is brought out of the operation state and $A_6$ into the operation state while the diode (or the lamp) $L_1$ for indication light up so as to inform the photographer of the completion of the charging. Hereby when the flash light device has operated, the charge completion signal to the terminal $b$ is interrupted for a little while so that $L_1$ also extinguishes once in such a manner that the operation of the flash light device can be confirmed while the photographer is looking through the view finder. At this time, $A_3$ is out of the operation state and therefore no information corresponding to the brightness of the object to be photographed either at the output terminal $f$ or $g$ and in its stead an output corresponding to the diaphragm information from the flash light device is produced at the output terminal. In the processing amplifier $A_6$ the absolute diaphragm value signal from the flash light device and the information of the F-value of the totally opened lens from $A_4$ are put, while at the output of the processing amplifier $A_6$ the diaphragm step number signal ($Av - Avo$) is produced and delivered to the diaphragm control circuit from the terminal $f$. On the other hand, the diaphragm step number signal and the signal of the F-value of the totally opened lens from $A_4$ are put in $A_5$ while at the output of $A_5$ a signal corresponding to the absolute diaphragm value for setting is produced and delivered to the indication, alarm circuit through the terminal $g$.

As explained above, the circuit shown in FIG. 6 is operated by the current source $E_1$ in such a manner that the operation states are automatically switch over to each other either for taking photograph under day light or under flash light whereby a necessary signal is produced at the output terminals $f$ and $g$. Even if the input terminals $b$ and $c$ shown in FIG. 6 are replaced for a common one as is shown in the system diagrams in FIG. 2, the circuit operates satisfactorily.

FIG. 7 shows a detailed circuit diagram of the second circuit part II in FIG. 5. To this circuit, a current is supplied from the current source $Eo$ through the switches $SW_6$ and $SW_4$, namely from the current source $E_2$ whereby the charge completion signal from the flash light device is put in the input terminal $b$. In the drawing, $VR_3$ is a variable resistance being set in functional engagement with the shutter time setting dial, while $C_2$ and $C_3$ are the condensers for time constant circuit whereby in case of the long shutter time photography $C_2$ and $C_3$ are connected in parallel to each other by means of the switch $SW_7$ being closed in accordance with the set range of the above mentioned shutter time setting dial. $T_1$ is the timing circuit, such as Schmitt circuit, $M_1$ is the magnet for controlling the time for actuating the rear plane of the focal plane shutter, $SW_5$ the shutter time count starting switch, $Rf$ the time constant resistance element for obtaining a shutter time suited for taking photograph under flash light whereby when the charge completion signal is put in the terminal $b$ for taking photograph under flash light, the resistance $VR_3$ in the time constant circuit is switched over to $Rf$ by means of the effect of the transistors $Q_9 - Q_{12}$ in such a manner that the shutter time assumes for example 1/60 sec. Hereby the transistors $Q_{13}$ and $Q_{14}$ are intended for disconnecting the condenser $C_3$ from the circuit at the time of taking photograph under flash light no matter whether the switch $SW_7$ is opened or closed. The operation of the circuit shown in the drawing is as follows. In case of taking photograph under day light the current is supplied to the circuit part from the current source $E_2$ while no charge completion signal is put in the terminal $b$ from the flash light device so that the $Q_{10}$ and $Q_{11}$ are in the switched off state while $Q_{12}$ is in the switched on state so as to connect $VR_3$ with the circuit. At the same time, when the front plane of the focal plane shutter is released so as to start running, the switch $SW_5$ is opened and the condenser $C_2$ (or $C_2$ and $C_3$) is charged through $VR_3$ in such a manner that after the elapse of a certain determined time the timing circuit $T_1$ is inversed so as to excited the magnet for allowing the rear plane of the focal plane shutter to start to run so that the shutter is closed. When the charge completion signal is put in the terminal $b$ in case taking photograph under flash light, $Q_9$ and $Q_{10}$ are closed while $Q_{12}$ is opened so that $Rf$ is connected with the circuit part instead of $VR_3$, whereby further $Q_{13}$ is closed while $Q_{14}$ is opened so that only $C_2$ is connected with the time constant circuit. Consequently, the timing circuit $T_1$ is inversed with a shutter time determined by $Rf$ and $C_2$, namely, the time suited for taking photograph under flash light so as to carry out an exposure. Because there switching over of the time are automatically carried out, there takes place no mistake in obtaining the shutter time due to the oblivion of setting the shutter time at the time of taking photograph under flash light or the eventual sliding of the set value due to some reasons.

FIG. 8 shows a detailed circuit diagram of the third circuit part in FIG. 5. To this circuit, a current is supplied from the current source $Eo$ through the switches $SW_6$ and $SW_9$, namely the current source $E_3$ while a current is directly supplied to a part of the circuit part from the current source $Eo$ whereby its power consumption is remarkably small. Further the diaphragm step number signal ($Av - Avo$) corresponding to the information of the brightness of the object to be photographed from the first circuit part or the information from the flash light device is put in the input terminal $f$ of the circuit part. The diaphragm step number signal put in the terminal $f$ is applied to the storage condenser $C_1$ through the storage switch $SW_3$ so as to be stored in the condensor $C_1$. After storage the voltage of $C_1$ is kept to remain even if the switch $SW_3$ is opened. The diaphragm step number signal stored in the condenser $C_1$ is put in the comparison device $A_8$ through the buffer $A_7$. $i_s$ is the constant current source for supplying a constant current to the variable resistance $VR_4$ whereby the signal from $VR_4$ whose resistance varies in accordance with the step number with which the photographic lens is closed from the F-value is compared with the stored step number signal from the above mentioned $A_7$ in $A_8$ in such a manner that when the both signals coincide with each other the diaphragm control magnet $M_2$ is actuated by means of the output of $A_8$. $C_4$ is a time constant condenser for delaying the actuation time of the magnet $M_3$ in the tensing circuit for a little time, $C_5$ is the time constant condenser intended for closing the switch $SW_8$ when the self timer is used and for delaying the actuating time of $M_3$, for example 8 seconds. $T_2$ is the timing circuit, $T_3$ the pulse generating circuit and $C_6$ the condenser for exciting the magnet $M_3$. The operation of the circuit is as follows. By means of the release operation the current source $E_3$ is connected with the circuit, whereby after the elapse of a little time determined by $C_4$ and others the timing circuit $T_2$ is inversed in such a manner that the pulse generating circuit $T_3$ produces a pulse at the output so as to actuate the magnet $M_3$. Almost at the same time, when by means of the magnet $M_3$ the mirror starts to move upwards, the storage switch $SW_3$ is opened. The diaphragm information stored in $C_1$ and the signal from $VR_4$ whose resistance varies in accordance with the displacement amount of the diaphragm preset member for the photographic lens starting to move only after the actuation of the magnet $M_3$ are put in the comparison device $A_8$ so as to be compared with each other in such a manner that when the both signals coincide with each other the magnet $M_2$ starts to operate whereby the position at which the diaphragm preset member stops is decided. By means of this position, the aperture of the photographic lens is set at a certain predetermined value by means of the automatic diaphragm lever at the time of taking photograph. Hereby it is possible to functionally engage $VR_4$ with the member directly connected with the diaphragm blades instead of the preset member. Hereby it is possible adopt the device disclosed in the Jap. Laid-Open patent specification No. Sho 49-82336 (applied on 9 Dec. 1972) applied by the same inventors as that of the present application as the mechanism for setting the operation of the magnet $M_2$ and the aperture of the photographic lens.

In order to take photograph by using the self timer, the switch $SW_8$ is manually closed and the operation of the magnet $M_3$ is delayed for example 8 seconds.

FIG. 9 shows the circuit diagram of the fourth circuit part in FIG. 5. To this circuit part the current is supplied from the current source $E_o$ through the transistor switching over circuit, namely the current source $E_4$, whereby the diaphragm step number signal respectively the absolute diaphragm value signal are put in the input terminal $f$ respectively $g$ from the first circuit part. The current is supplied to this circuit part from the current source $E_4$ since the switch $SW_1$ in functional engagement of the first step of the shutter release is closed till the switch $SW_2$ in functional engagement with the second step of the shutter release is closed. In the drawing, $A_9$ is the AD converting device for minal $g$ into a digital signal produced at the output, which digital signal is decoded by means of the decoder driver $A_{10}$ into a signal suited for indication and led to the indication device $A_{11}$. $A_{11}$ consists for example of a seven segment illuminating diode elements and indicates the diaphragm value corresponding to the absolute diaphragm value signal put in the terminal $g$ in letters or figures. When this indication reaches or exceeds the limit value of the diaphragm, for example F22, the level detector $A_{12}$ detects the fact and controls the oscillator $A_{13}$ by means of whose output the indication in the indication device 11 is lighted and extinguished so as to give alarm. On the other hand, the diaphragm step number signal put in the terminal $f$ is also detected by means of the level detector $A_{14}$ in such a manner that when the signal reaches or exceeds the limit value at the open side of the photographic lens, for example, F 1.4, the oscillator $A_{15}$ is controlled so that the indication in the indication device 11 is lighted or extinguished by means of the output of $A_{15}$ so as to give alarm. Even in case of taking photograph under flash light, the signal put in the terminal $f$ and $g$ is automatically switched over in the first circuit part so that the same indication and the alarm can be made as above mentioned. The circuit shown in FIG. 9 is so designed that the diaphragm value indication device lights and extinguishes to give alarm whereby it is possible to distinguish or lower the lamp or to provide another indication device for alarming. Further it is possible to indicate the diaphragm value by using ampere meter instead of the indication by the lamp.

The operation of the camera system in accordance with the present invention is as follows. In case of taking photograph under day light the film sensitivity, the shutter time and the diaphragm value to be decided in accordance with the brightness of the object to be photographed are indicated at the first step of the release operation, whereby in case of necessity alarm is given, while at the second step of the release operation the aperture of the photographic lens is automatically closed down to the above mentioned set value and the shutter operates with the set shutter time so as to obtain a proper exposure. When the flash light device is ready for operation in case of taking photograph under flash light, all the circuits for the indication, the alarm, the diaphragm control and the shutter time control are automatically switched over for taking photograph under flash light, whereby the charge completion indication is made in the view finder.

Figure 10:
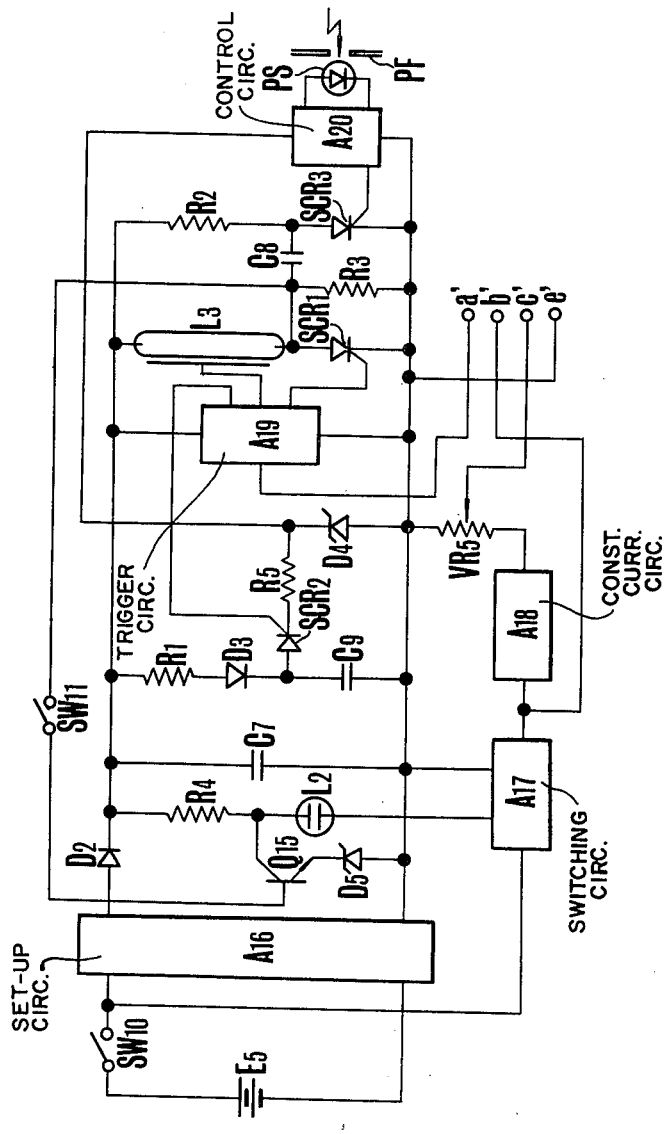
FIG. 10 shows a circuit diagram of an embodiment of a flash light device composing the photographic system in accordance with the present invention.

FIG. 10 shows an embodiment of the flash light device (B in FIG. 1) composing a photographic system together with the camera (A in FIG. 1) in accordance with the present invention explained in detail in FIGS. 5 to 9. In the drawing, $E_5$ is the current source, $SW_{10}$ the current source switch, $A_{16}$ the other current source, for example, a transistor D.C. step up circuit. The circuit represents an automatic light sensing speed light device of the series control type, presenting terminals $a'$, $b'$, $c'$ and $e'$, which are respectively connected with the terminals $a$, $b$, $c$ and $e$ at the camera side. When the current source switch $SW_{10}$ in the drawing is closed, the current from the current source $E_5$ is step up by the step up circuit $A_{16}$ and rectified by the diode $D_2$ so as to charge the main capacitor $C_7$ and $C_9$, $C_8$. As soon as the charge voltage of the main capacitor $C_7$ reaches a certain predetermined value capable of actuating the flash light tube $L_3$, the neon lamp $L_2$ starts to discharge whereby the switching circuit $A_{17}$ is closed through the resistance. Hereby the completion of charge is indicated at the flash light device said by the discharge of the neon lamp $L_2$. When $A_{17}$ is closed, the voltage of the electric source $E_5$ is applied to the constant current circuit $A_{18}$ and the output terminal $b'$ through $A_{17}$. At both ends of the output load $VR_5$ of the constant current circuit $A_{18}$ a constant voltage is produced, whereby setting on $VR_5$ the diaphragm information decided in accordance with the film sensitivity and the switching over of the flash light amount level their Apex information is produced at the terminal $c'$. Namely the diaphragm information signal produced at $c'$ is the signal compressed in accordance with the circuit characteristic at the camera side, for example, so composed that the value changes by a certain predetermined value for each one step of the diaphragm variation. Aso soon as the flash light device is ready for operation, the shutter time control circuit, the diaphragm control circuit, the indication and alarm circuit are all switched over for taking photograph under flash light by means of the signal from the output terminal $b'$, whereby the charge completion is indicated in the view finder. Hereby in accordance with the diaphragm information from the terminal $c'$ the diaphragm control circuit and the indication and alarm circuit are controlled. When at this time, the diaphragm value set at the flash light device side is outside of the diaphragm value range of the photographic lens, the alarm circuit operates to indicate the alarm in the view finder likely to the case of taking photograph under day light. When in this state the shutter release is operated, the synchronizing switch connected with the terminal $a'$ is closed at the camera side in such a manner that the trigger circuit $A_{19}$ of the flash light device is actuated through the common feed back terminal $e'$. The discharge tube $L_3$ is actuated by means of the output pulse of $A_{19}$, whereby the thyristers $SCR_1$ and $SCR_2$ are brought in the switched on state. When $SCR_2$ is brought in the switched on state, the charge of the condenser $C_9$ is applied to the diode $D_4$ whose potential is applied to the light amount control circuit $A_{20}$ for several microsecond. On the other hand, the light beam reflected from the object to be photographed enters into the light sensing element PS when $L_3$ discharges, by means of the output of which light sensing element the light amount control circuit $A_{20}$ is operated in such a manner that as soon as a proper exposure is obtained, a stop signal is applied from $A_{20}$ to the thyrister $SCR_3$ so as to close it. When $SCR_3$ is closed, the charge in the condenser $C_8$ runs toward $SCR_1$ so as to open it. Thus the discharge of the tube $L_3$ stops. As mentioned above, the camera side carries out operations for taking photograph under flash light while the light amount of the flash light device is also so controlled as to obtain a proper exposure.

Further in case a switch $SW_{11}$ for confirming the discharge of the tube $L_3$ is closed, the voltage between both ends of the resistance $R_3$ is applied to the base of the transistor $Q_{15}$ whereby the tube $L_2$ does not discharge unless the constant voltage of the diode $D_5$ becomes smaller than $Vbe$ of $Q_{15}$ so that the switching circuit $A_{17}$ is not closed. Namely, when the switch $SW_{11}$ is closed, no charge completion signal is issued before the condenser $C_8$ is sufficiently charged so that the camera side can not be switched over for taking photograph under flash light. Thus the camera side can never be switched over for taking photograph under flash light before the flash light device is ready for operation. Even in case the main capacitor discharges only a little (in case of a light sensing speed light of the series control system) because the object to be photographed is very near, the above mentioned $L_2$ as well as $L_1$ at the camera side extinguishes for a certain time so that it is possible to confirm the discharge of the flash light device even in case of a single reflex camera in which the view finder is once covered by the raised mirror at the time of taking photograph. When the switch $SW_{11}$ is opened, it is possible to distinguish whether the object to be photographed is near of distance according to the length of the time during which $L_2$ extinguishes whereby it is possible to learn the completion of the charge instantly by the lighting up of the lamp. Further even when the main capacitor $C_7$ has sufficient residual charge, the switching over at the camera side can not be carried out because the switching circuit $A_{17}$ is opened by opening the current source switch $SW_{10}$.

In case of the embodiment shown in FIG. 10, the number of the terminals for connecting camera with the flash light device is 4, while it is possible to reduce the number down to 3 as is shown in FIG. 2. Namely, it is so designed that the signal voltage is produced at the terminal only when the camera is ready for operation, it is possible to eliminate the terminal $b'$, making $c'$ the terminal $d'$ in FIG. 2 in such a manner that a camera so designed can be utilized in combination.

Figure 11:
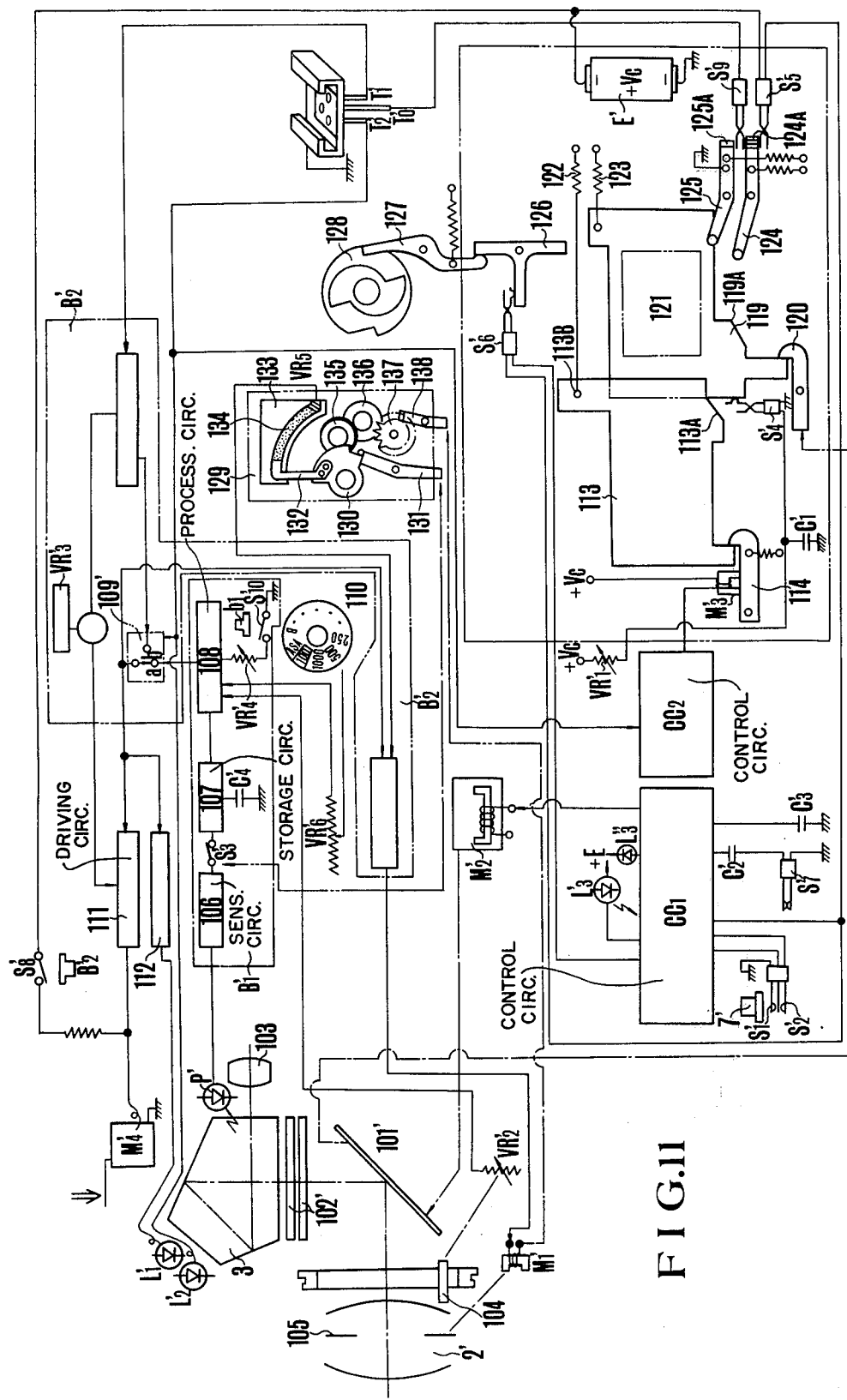
FIG. 11 shows the construction of a single reflex camera for showing another embodiment of the camera system in accordance with the present invention.
Figure 12:
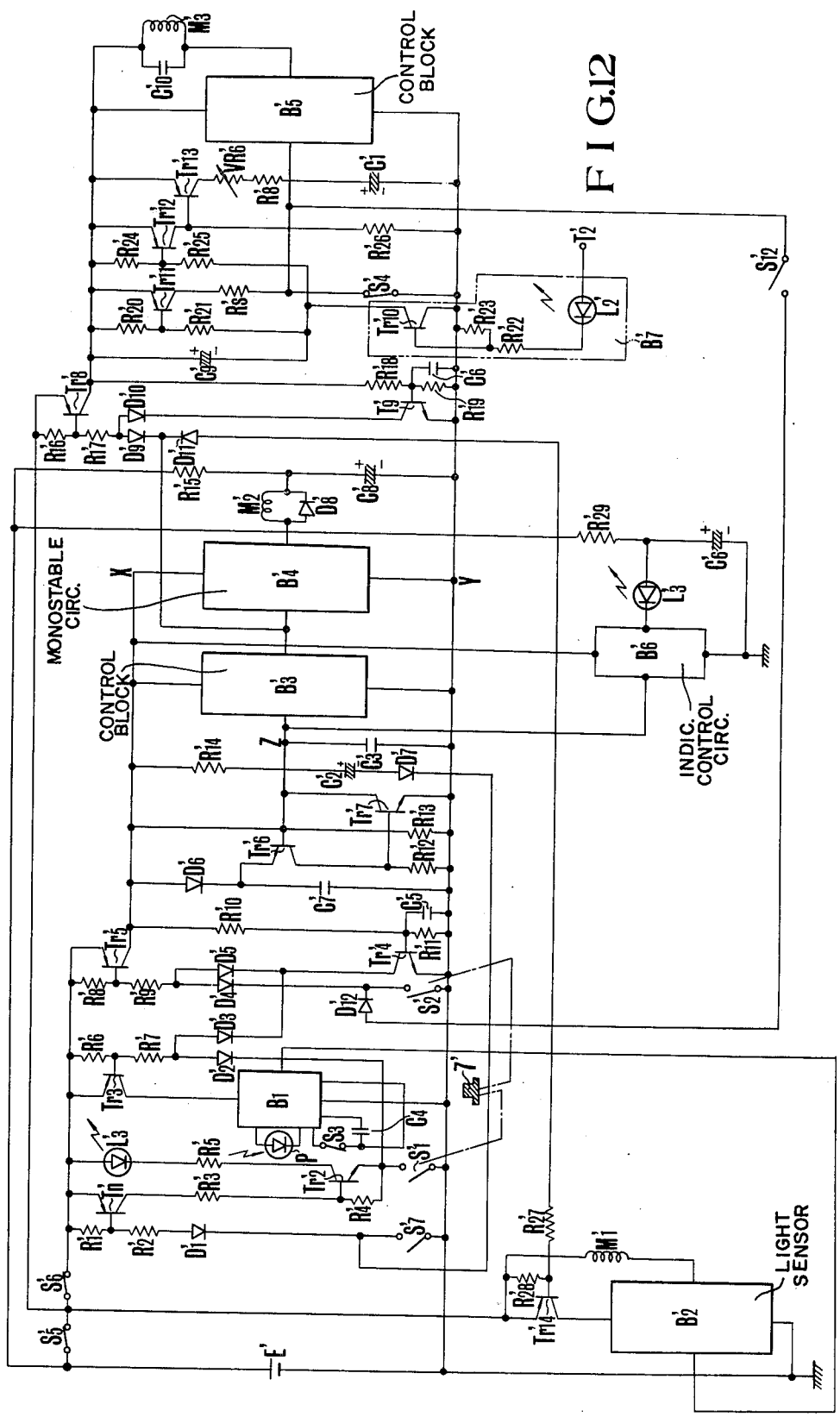
FIG. 12 shows the control circuit shown in FIG. 11.

FIG. 11 shows a composition of a single reflex camera as another embodiment of the camera system in accordance with the present invention. In the drawing, 101' is the quick return mirror, 102' and 103 the Fresnel lens, the focusing plate and the eye piece lens forming the conventional single reflex view finder optical system, P' the light sensing diode element such as SBC being arranged above the eye piece lens, $L'_1$ and $L'_2$ the illumination diodes arranged near the pentagonal lens for indicating alarm, and 104 the signal member being provided at the end face of the exchangeable lens 2', presenting a length corresponding the value of the maximum aperture of the lens along the direction of the optical axis and serving as a signal pin for compensation of the error taking place when the TTL totally opened light sensing is carried out while the automatic diaphragm 105 arranged in the exchangeable lens 2' is set at the largest aperture. $VR'_2$ is the variable resistance whose value is automatically set by means of the signal member 104, $B'_1$ the light sensing circuit block consisting of the storage circuit 107 being connected with the light sensing element P', by means of the storage switch $S'_3$ being operated by the magnet $M'_2$ and of the processing circuit 108, whereby the output of the light sensing circuit block is connected with the automatic exposure deciding circuit block $B'_2$ through the photographic mode switching over switch 109'. In case of taking photograph under day light the contact $a$ of the switching over switch is chosen while the contact $b$ is chosen in case of taking photograph under flash light. Hereby $b_1$ in the light sensing circuit block $B'_1$ is the K-value button which is operated in case of intentionally taking a special photograph with inproper exposure, whereby the detailed explanation is omitted. 110 is the shutter time dial which is so designed that the variable resistance $VR'_6$ is electrically connected in the circuit 108 in such a manner that the value of the variable resistance $VR'_6$ is adjusted by the shutter time setting and thus the shutter time information is put in the processing circuit 108. The deciding circuit block $B'_2$ presents another input to be connected with the output of the processing circuit by means of the switching over switch. The indication device driving circuit 111 and the alarm circuit are connected with each other in such a manner that the meter $M'_4$ and the illumination diodes $L'_1$, $L'_2$ are connected with each other so that the diaphragm value at the time of taking photograph is indicated in advance by the pointing finger of the meter $M'_4$ while in case a proper exposure can not be obtained with the set shutter time, the illumination diodes $L'_1$ or $L'_2$ is selectively lighted so as to alarm the over exposure or the under exposure. $M'_1$ is the electromagnet to be connected with the ouput of the deciding circuit, being intended for controlling the aperture deciding mechanism. $CC_1$ is the control circuit presenting the control block $(B'_3)$ for the camera actuating electromagnet $M'_2$, the monostable circuit block $(B'_4)$ and the indication control circuit $(B'_6)$, (FIG. 12). The illumination diodes $L'_3$, $L''_3$ are connected with the indication control circuit. $CC_2$ is the control circuit presenting the control block $B'_5$, $B'_7$ (FIG. 12). $M'_3$ is the control magnet to be connected with the output of the control circuit block $B'_5$, for controlling the engaging member of the rear plane 113 of the focal plane shutter. $S'_1$, and $S'_2$ are the switches arranged so as to be in functional engagement of the shutter release button in such a manner that the switch $S'_1$ is closed at the first push down operation of the release button while the switch $S'_2$ is closed at the second push down operation of the release button, whereby both switches return to the switched off state when the release button 7' is freed. $S'_7$ is the switch so designed as to close in functional engagement of the self-timer set dial not shown in the drawing. 119 is the front plane of the focal plane shutter while 120 is the front plane engaging member being functionally engaged with the driving mechanism of the mirror in such a manner that the engagement with the front plane 119 is freed at the time when the mirror has been raised. 121 is the exposure frame, 122 and 123 respectively the springs for driving the front plane and the rear plane of the focal plane shutter, 124 the switching over lever being displaced in engagement with the cam part 119A of the front plane 119 and 125 the switching over lever being displaced in engagement with the cam part 113A of the rear plane 113 whereby the levers respectively present the switches $S'_5$, $S'_9$ at the bended ends 124A and 125A. 126 is the switching lever being rotated by the end part 113B of the rear plane 113 so as to bring the switch $S'_6$ out of the switched on state into the switched off state, while 127 engages with the switching over lever 126 with the one end and with the cam 128 being rotated by 180° in functional engagement with the charge mechanism with the other end. 129 is the aperture deciding mechanism provided at the side surface of the box of the mirror 101' in the camera body (disclosed in the Japanese Patent Application Laid-Open No. Sho 49-82336) while 130 is the main driving sector gear being excited clockwise by means of a spring not shown in the drawing whereby its end face is prevented from rotating by means of the engaging lever 131. 132 is the slide fixed on the sector gear, so designed to be slidable on the resistance sheet cemented on the insulation plate 133, forming a variable resistance $VR_5$ connected with the deciding circuit $B'_2$. 135 – 137 the accelaration gear group composing governer gear whereby to the last gear 137 an engaging lever 138 with the one end attracted by the magnet $M'_1$ and the other end preventing the gear 137 from the rotation is provided. The sector gear 130 drives the diaphragm preset circular cam piece provided in the exchangeable lens 2' by means of the connecting mechanism not shown in the drawing, whereby the detailed explanation is omitted, having nothing to do with the present invention. $S'_8$ is the switch being brought in the switched on state in functional engagement of the current source voltage check button. FIG. 12 shows the blocks $B'_1 - B'_6$ shown in FIG. 11 more concretely. In the drawing, the switches $S'_1 - S'_{10}$, the condensers $C'_1 - C'_{10}$, the resistances $VR'_1 - VR'_6$ and the magnet $M'_1 - M'_3$ are same as in FIG. 11. In FIG. 12, $R'_1$ and $R'_2$ are the voltage dividing resistances, $D'_1$ the nonreturn diode, whereby the base of the transistor $Tr'_1$ is connected with the voltage dividing point of the voltage dividing resistances. $Tr'_2$ is the illumination diode driving transistor whose base is connected with the voltage of the voltage dividing resistance $R'_3$, $R'_4$ being connected with the collector of the transistor $Tr'_1$ and in whose collector circuit the self-timer set indication illumination diode $L'_3$ is connected. $C'_4$ is the condenser being connected in the storage circuit 107 for storing the value of the brightness of the object to be photographed, $S'_3$ is the storage switch being opened before the mirror is raised in functional engagement of the operation of the magnet $M'_2$ for releasing the quick return mechanism not shown in the drawing. The storage switch $S'_3$ is connected in the storage circuit of the light sensing circuit of the block $B'_1$ so that the value of the brightness of the object immediately before the mirror is raised is stored in the storage condenser $C'_4$ as an electrical signal. $Tr'_5$ is the transistor whose base is connected with the voltage dividing point of the voltage dividing resistances $R'_8$ and $R'_9$ and which is connected with the switch $S'_2$ and the collector of the holding transistor $Tr'_4$ through the non-return diodes $D'_4$, $D'_5$ being connectd parallel to each other. $Tr'_5$ is the transistor presenting an efficiency for supplying the current to the control blocks $B'_3$, $B'_4$ only in case of necessity, whereby the transistor $Tr'_5$ is brought in the switched on state, when the switch $S'_2$ is closed at the second step of the shutter button 7' in such a manner that the transistor $Tr'_4$ is brought in the switched on state through the resistance $R'_{10}$. The base potential of the transistor $Tr'_5$ is kept at low level by the switching on of the transistor $Tr'_4$ so that even if the switch $S'_2$ is brought back in the switched off state by freeing the button 7', the transistor $Tr'_5$ is kept in the switched on state by means of the voltage of the condenser $C'_5$. $R'_{14}$ and $C'_3$ are the resistance and the condenser for composing a delay circuit for delaying the operation of the camera during the light sensing in case of taking photographs continuously whereby their impedance values are so chosen as to produce a time constant of about 100 m. sec. $C'_2$ is the self-timer time adjusting condenser being connected parallel to the condenser $C'_3$ and the timer set switch $S'_7$ through the non-return diode $D'_7$, $Tr'_6$ and $Tr'_7$ are the transistor for discharging the condensers $C'_2$, $C'_3$ so as to resume the reset state, and $C'_7$ is the discharge time control condenser. $C'_8$ and $R'_{15}$ are the condenser for storing the charge for quickly exciting the starting magnet $M'_2$ and the resistance for charging. The output of the control block $B'_3$ is connected with the base of the transistor $Tr'_{14}$ through the diode $D'_{11}$ and the resistance $R'_{27}$. The transistor $Tr'_{14}$ is the current supply control transistor being connected in the current supply conductor of the control block $B'_2$. The control block $B'_6$ whose input is connected with the condensers $C'_2$ and $C'_3$ is the block for predicting the operation of the self-timer, being composed of the conventional switching circuit whereby in comparison with the threshold of the conventional switching circuit forming the input part of the control block $B'_3$, the above mentioned switching circuit has a little lower conductivity level. $C'_{11}$ and $R'_{29}$ are respectively the condenser for storing energy to light the illumination diode $L''_3$ and the resistance for controlling the charging current. The switch $S'_4$ is the starting switch which is closed by the end face of the front plane of the focal plane shutter before the start of the front plane and opened at the same time with the start of the front plane. $C'_1$ is the shutter time setting condenser forming a time constant circuit together with the variable resistance $VR'_6$ whose resistance value can be varied by means of the shutter dial. $Tr'_8$ and $Tr'_9$ are the transistors for controlling the current supply to the control block $B'_5$ whereby the base of the transistor $Tr'_8$ is connected with the voltage dividing point of the voltage dividing resistances $R'_{16}$ and $R'_{17}$ while the base of the transistor $Tr'_9$ is connected with the voltage dividing point of the voltage dividing resistance $R'_{18}$, $R'_{19}$ so that the transistor $Tr'_8$ is in the switched on state namely into the conductive state, when the transistor $Tr'_9$ is brought into the conductive state so as to lower the base level of the transistor $Tr'_8$ so as to keep the transistor $Tr'_8$ in the switched on state. $L'_2$ is the illumination diode being connected with the accessary shoe terminal $T'_2$ of the camera, and with the neon tube circuit connected with the main capacitor of the conventional flash light device (FIG. 14), whereby the illumination diode light when the charge potential of the main capacitor at the flash light side reaches a certain predetermined value. The transistor $Tr'_{10}$ is brought into the conductive state when the base of the transistor is connected with the diode. The block $B'_7$ is connected with the diode. The block $B'_7$ is the control circuit block for producing the control signal for automatically swtiching over the shutter time to the flash light time by means of the charge completion signal from the flash light device, whereby the collector of the transistor $Tr'_{10}$ is connected with the transistor $Tr'_{11}$. Thus when the transistor $Tr'_{10}$ is brought in the switched on state, the transistor $Tr'_{11}$ is also brought in the switched on state in such a manner that the resistance $R'_s$ is connected in series with the condenser $C'_1$. On the other hand, when the transistor $Tr'_{10}$ is brought in the switched on state, the transistor $Tr'_{12}$ is brought in the switched on state while the transistor $Tr'_{13}$ is brought in the switched off state so that the shutter time is set at a value, for example 1/60 sec. being decided by the time constant circuit consisting of the resistance $R_s'$ and the condenser $C'_1$.

The condenser $C'_9$ being connected with the transistor $Tr'_{10}$ is charged by the transistor $Tr'_{10}$ for preventing the charge completion signal from becoming instable when the flash light operates in such a manner that the reestablishment of the shutter time for day light from that for flash light is delayed. When in the above mentioned composition the switch $S'_1$ is closed at the first step of the shutter button 7' after the self-timer set dial not shown in the drawing being set for self-timing and the switch $S'_7$ being closed, the transistors $Tr'_1$ and $Tr'_2$ are brought in the switched on state because the switches $S'_5$ and $S'_6$ are closed so that the illumination diode $L'_3$ for indicating the self-timer mode lights us so as to inform the photographer that the photograph is to be taken with the self-timer mode. In the meantime an electrical signal corresponding to the brightness of the object to be photographed is produced in the light sensing element P' by means of the light beam passing through the exchangeable lens so as to be stored in the storage condenser. The shutter time has already been set at a certain predetermined value before taking photograph in such a manner that the processing circuit 108 is ready for processing the diaphragm value for obtaining the proper exposure basing upon the predetermined set information by means of the information input from the variable resistance $VR'_6$ in functional engagement with the shutter dial 110. When the shutter button 7' is further pushed down the switch $S'_2$ is closed so that the transistor $Tr'_5$ is brought in the switched on state while the holding transistor $Tr'_4$ is at the same time brought in the switched on state in such a manner that the transistor $Tr'_5$ is kept in the switched on state. As the result the current starts to be supplied to the control block $B'_3$, $B'_4$ so as to bring the block in operation. At the same time, with the start of the current supply the transistor $Tr'_7$ is brought in the switched off state so that the time constant circuit consisting of the condensers $C'_2$, $C'_3$ and the resistance $R'_{14}$ starts to be charged. As soon as the charge voltage of the condensers $C'_2$ and $C'_3$ is raised up to the level immediately before the control block $B'_3$ starts to operate, the control block $B'_6$ is brought in the switched on state and the illumination diode $L''_3$ lights up by the charge in the condenser $C'_{11}$. When the shutter release button is freed the above mentioned diode $L'_3$ extinguishes by opening the switch $S'_1$ so that the unnecessary consumption of the electric power is eliminated while the illuminating diode $L''_3$ lights for the time proportional the charge in the condenser $C'_{11}$ and then extinguishes. When after the lighting of the diode $L''_3$ the charge level of the condensers $C'_2$ and $C'_3$ is further raised, the control block $B'_3$ operates so as to actuate the monostable multivibrator circuit $B'_4$. As the result a driving pulse is applied to the electromagnet $M'_2$ so that the quick return mechanism of the mirror is released. At this time, the transistor $Tr'_{14}$ is brought into the switched on state by means of the output signal from the control block $B'_3$, so that the current starts to be supplied to the control block $B'_2$. When the engagement of the sector gear 130 is released by the lever 131 by releasing the mirror mechanism, the slide 132 starts to rotate to the right. When the sector gear rotates up to a position corresponding to the diaphragm value for a certain predetermined proper exposure basing upon the resistance input of the variable resistance $VR'_5$ consisting of the slide 132 and the resistance 134, the object brightness information in the storage condenser and the shutter time information, the electromagnet $M'_1$ is excited by means of the control block $B'_2$ while the gear is disengaged by the lever 138 in such a manner that the diaphragm preset mechanism at the exchangeable lens, in functional engagement with the sector gear 130 is set at the predetermined value. On the other hand, the transistor $Tr'_8$ is also brought in the switched on state by the operation of the control block $B'_3$ so that the current starts to be supplied to the control block $B'_5$. The shutter is opened by releasing the front plane of the focal plane shutter by means of the engaging member 120 in functional engagement with the mirror when the mirror has been raised up, while during the upward movement of the mirror the automatic diaphragm mechanism at the camera side closes the diaphragm down to the preset value. At the same time with the start of the front plane of the focal plane shutter the switch $S'_4$ opens and the condenser $C'_1$ starts to be charged through the resistance $VR'_6$. When the front plane of the focal plane shutter assumes the totally opened position, the switch $S'_9$ closes. When after a elapse of the preset time the electromagnet $M'_3$ stops to be excited, the rear plane 113 of the focal plane shutter is released, so as to complete the shutter operation, whereby the switch $S'_5$ is opened by means of the rear plane of the focal plane shutter so that all the transistors $Tr'_5$, $Tr'_3$ and $Tr'_{14}$ supplying current to all the control blocks are brought in the switched off state so that the current supply to these blocks ceases. Namely, only the minimum electric power is supplied to these blocks only in case of necessity. In case the speed light device (FIG. 14) is mounted on the accessary shoe of the camera, the charge voltage of the main capacitor in the speed light device is detected by means of a conventional voltage detecting circuit with neon tube whose output is applied to the diode $L'_2$ through the terminal $T'_2$. As the result the diode lights up, the transistor $Tr'_{10}$ is brought into the switched on state while the transistors $Tr'_{13}$ is brought in the switched off state so that the time constant circuit to be connected with the input of the control block $B'_5$ consists of the resistance $Rs'$ and the condenser $C'_1$, whereby the shutter time is set by this time constant for the speed light.

In case of the ordinary photographic mode under day light the switch $S'_7$ is opened so that the time constant circuit to be connected with the input of the control block $B'_3$ consists of the resistance and the condenser $C'_3$. Therefore, before the transistor $Tr'_8$ is brought in the switched on state in engagement with the shutter release operation, the charge of the condensers $C'_2$ and $C'_3$ is discharged by the charge of the condenser $C'_7$, so that the control block $B'_3$ operates after the elapse of a time $R'_{14} \times C'_3$ after the transistor $Tr'_5$ is brought in the switched on state so as to operate the electromagnet $M'_2$, whereby the minimum time needed for the light sensing operation can be obtained to detect the brightness of the object to be photographed with high accuracy. Other operations are same as mentioned above.

Figure 13:
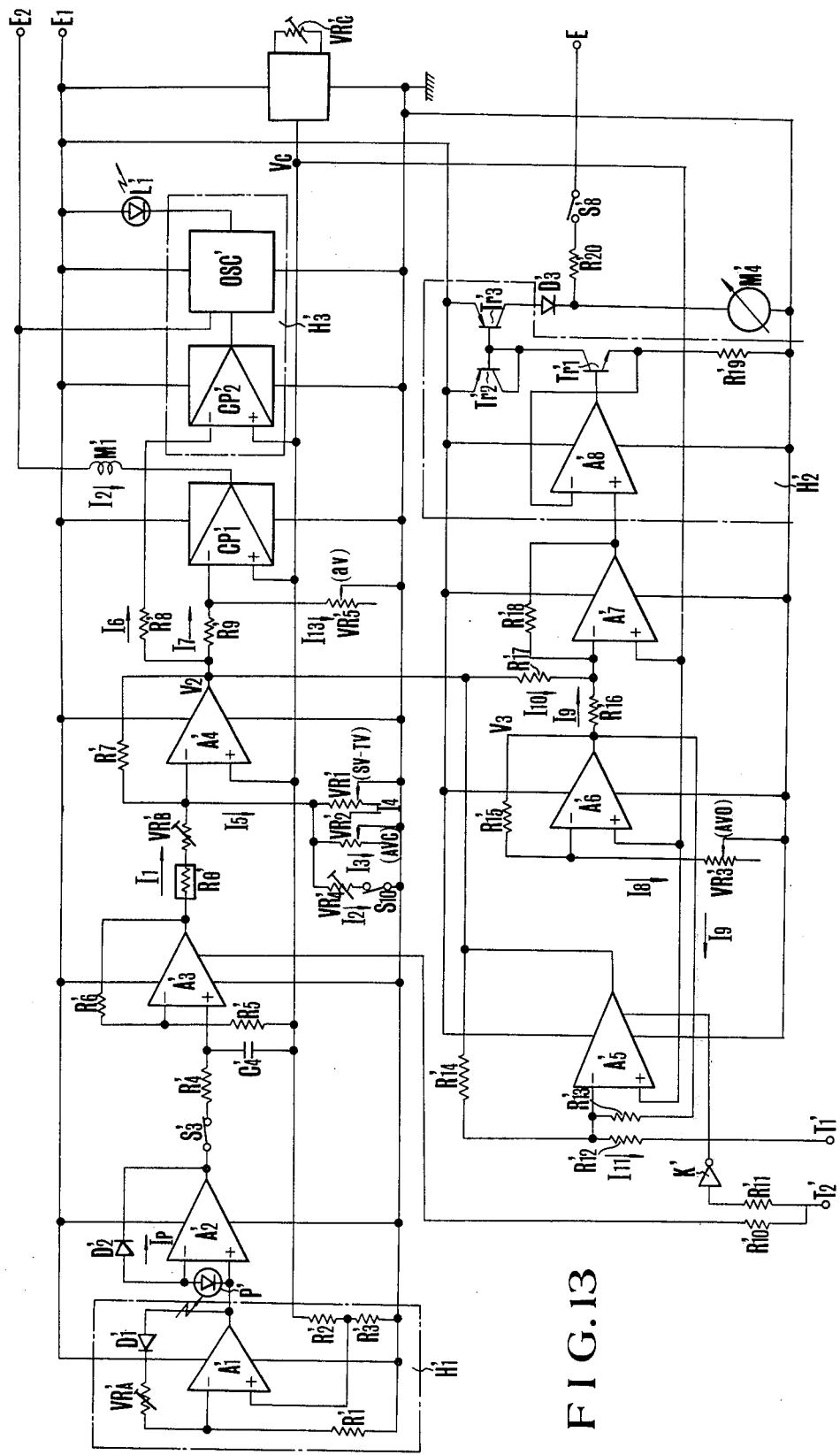
FIG. 13 shows the circuit diagram of a concrete embodiment of the control block shown in FIG. 12.

The switch $S'_{12}$ to be connected between the condenser $C'_1$ and the switch $S'_2$ through the non-return diode $D'_{12}$ is the switch which is closed in functional engagement with the setting of the shutter dial 110 at the B photographic set position, whereby in the case of the B photography the variable resistance $VR'_6$ is set at a certain proper value. When the shutter dial 110 is set at B and the shutter release button is pushed down, a discharge route is formed to the condenser $C'_1$ through the switch $S'_{12}$ and the diode $D'_{12}$, so that the condenser $C'_1$ is not charged but only the front plane starts to run, namely the shutter is kept opened. When the release shutter button 7' is freed the switch $S'_z$ is opened, when the condenser $C'_1$ is charged through the resistance $VR'_6$ in such a manner that after a certain determined time the electromagnet $M'_3$ is excited and the rear plane 113 of the focal plane shutter 113 starts to run, namely the shutter is closed. FIG. 13 shows a circuit diagram of the concrete embodiment of the above mentioned control block $B'_1$ and $B'_2$ in case the light sensing indication system in accordance with the present invention is applied to the camera composed as mentioned above. Below the control block $B'_1$ shown in FIG. 12 will be explained in detail in accordance with FIG. 13. In the drawing $A'_1 - A'_8$ are the processing amplifier whereby when there is no signal from the flash light device at the charge completion signal terminal $T'_2$, the processing amplifier $A'_3$ is in the switched on state while the processing amplifier $A'_5$ is in the switched off state. $H'_1$ is the temperature compensation block for the logarithmic amplifier $A'_2$, being connected with the non inversible input terminal of the logarithmic amplifier $A'_2$. The logarithmic amplifier $A'_2$ forms the logarithmic amplifier circuit together with the diode $D'_2$, while on the other hand, the logarithmic amplifier is connected with the storage condenser $C'_4$ in such a manner that the photoelectric current Ip produce by the light sensing element P' provided in the light sensing system corresponding to the brightness of the object is compressed by means of the logarithmic diode $D'_2$ and is stored in the storage condenser $C'_4$ through the storage switch $S'_3$ and the resistance $R'_4$ for preventing flickering. The voltage of the charged condenser $C'_4$ is amplified by the buffer amplifier $A'_3$ with high input impedance in such a manner that the output of the amplifier $A'_3$ is put in the processing amplifier $A'_4$ as signal current $I_1$ through the temperature compensation resistance $R'_o$ and the control resistance $VRB'$. Further the informations such as of the shutter time $Tv$ to be set, the difference of the film sensitivities, the curving compensation ($Avc$) and the exposure amount compensation (K) are put in the processing amplifier $A'_4$ as a signal current $I_5$. By processing the signal currents $I_1$ and $I_5$ by the amplifier $A'_4$ the diaphragm step number signal voltage $V_2$ is obtained. This diaphragm step number signal $V_2$ is led to the low alarm indication LED control block $H'_3$ in such a manner that when the signal is outside of the diaphragm control range, the oscillator is operated by the signal current $I_6$ produced by the processing amplifier $A'_4$ and the lump LED,$L'_1$ for the low alarm indication lights and extinguishes. Further the diaphragm signal $V_2$ is put in the processing amplifier $A'_7$ as signal current $I_{10}$ and processed with the signal current $I_9$ as the information of the diaphragm value ($Avo$) of the totally opened photograhic lens so as to produce the diaphragm value ($|Av|$). $A'_7$ is the buffer amplifier for the information of the diaphragm value signal of the totally opened photographic lens. This diaphragm value output ($|Av|$) is led to the meter driving block $H'_2$ so as to drive the meter $M'_4$ and indicate the diaphragm.

Below the case when a signal arrives from the charge completion signal terminal. In this case by means of the charge completion signal the amplfier $A'_3$ is brought in the switched off state while the amplifier $A'_5$ is brought in the switched on state in such a manner that the signal reaches the external diaphragm control system and not the ordinary light sensing system. The signal from the diaphragm information terminal $T'_1$ is put in the processing amplifier $A'_5$ as signal current $I_{11}$ and processed together with the signal current $I_9$ of the above mentioned diaphragm value of the totally opened photographic lens so as to produce the diaphragm step number signal voltage $V_2$ and indicate the diaphragm value, by driving the meter $M'_4$.

Below the control block $B'_2$ shown in FIG. 12 is explained. This block is intended to compare the above mentioned diaphragm step number signal voltage $V_2$ and the diaphragm step number ($av$) of the lens so as to close the aperture of the lens down to the proper position. The diaphragm step number signal $V_2$ is led to the converter $CP'_1$ as the signal current $I_7$ through the resistance $R'_9$. Hereby the diaphragm step number signal has been led to the converter as the signal current $I_{13}$ from the variable resistance $VR'_5$ in accordance with the aperture to be preset on the variable resistance $VR'_5$ by means of the mechanism 129 shown in FIG. 11. When $I_7$ becomes equal to $I_{13}$ during the comparison, the current supply to the AE control magnet is interrupted in such a manner that the diaphragm is set at a certain predetermined value.

The operation in the photographic mode under day light will be explained in accordance with FIG. 13. Because there is no signal from the flash light device the terminal $T'$ of the accessary shoe is opened so that $A'_3$ is brought in the switched on state while $A'_5$ is brought in the switched off state. At the first step of the shutter release button the current source $E'_1$ is connected whereby the photoelectric current Ip, corresponding to the brightness of the object is produced in P· in accordance of the brightness of the light beam entering into the photodiode P' through the optical system from the object to be photographed. This photoelectric current Ip is compressed in the logarithmic diode $D'_2$ and is stored in the storage condenser $C'_4$ as output of the amplifier $A'_2$ through the storage switch $S'_3$ and the delay resistance $R'_4$ (for preventing flickering). The voltage $V_1$ of the charge in $C'_4$ is amplified in the buffer amplifier $A'_3$ with high input impedance and put in the precessing amplifier $A'_4$ through the temperature compensating resistance $R'_6$ and the control resistance VRB'. The input current in the amplifier $A'_4$ is given from the following equation;

$$I_1 = (V_1 - Vc)/(R'_6 + VRB')$$

or $I_1 \propto (Bv - Avo - Avc)$

Further for the amplifier $A'_4$ the following relations are established in connection with the information setting resistances, $VR'_1$, $VR'_2$ and $VR'_4$.

$$I_2 = (Vc/VR'_4) \propto K \text{ value}$$

$$I_3 = (Vc/VR'_2) \propto + Avc$$

$$I_4 = (Vc/VR'_1) \propto (Sv = Tv)$$

In short the sum of $I_5$ of the currents $(I_1 - I_4)$ is put in the amplifier $A'_4$. Namely, $$I_5 = I_4 + I_2 + I_3 = Vc \left[(1/VR'_1) + (1/VR'_2) + (1/VR'_4)\right],$$

On the other hand, the processing amplifier $A'_4$ produces $V_2$ as output, adding $I_1$ to $I_5$, so that the value is proportional to the diaphragm step numbers $$I_1 + I_5 = \frac{V_1 - V_c}{R'_0 + VRB} + Vc\left(\frac{1}{VR'_1} + \frac{1}{VR'_2} + \frac{1}{VR'_4}\right) \propto$$

$$(Bv + Sv - Tv - Avo + K)$$

Hereby $V_2 = (I_1 + I_5) \times R'_7 + Vc.$

In case the output $V_2$ of the processsing amplifier $A'_4$ is larger than the standard voltage $Vc$ and the output current $I_6$ is larger than or equal to 0, $[I_6 = (V_2 - Vc)/sR'](I_6 \propto Bv + Sv - Tv - Avo + K \propto$ diaphragm step number) is in the normal photographic range so that the low alarm indication LED control block $H'_3$ is in the switched off state and the illumination diode $L'$ does not lights up. When on the other hand, $I_6$ is smaller than 0, it is outside of the normal photographic range so that $H'_3$ is brought in the switched on state and by means of the output of the oscillator OSO']- the diode $L_1$ lights and extinguishes repeatedly to indicate alarm.

The output $V_2$ of the processing amplifier $A'_4$ is added to the voltage $V_3$ in which the current from the information resistance $VR'_3$ is converted by the amplifier $A'_6$, in the amplifier $A'_7$. On the other hand, on the variable resistance $VR'_3$ a certain predetermined value of the resistance has been set in accordance with the maximum aperture value of the photographic lens mounted so that the current $I_8$ in the variable resistance is given from the following equation;

$$I_8 = Vc/VR'_3 (\propto Avo)$$

Thus the output voltage of the amplifier $A'_8$ is given by;
$V_3 = I_8 \times R'_{15} + Vc$ ($\propto Avo \propto$ F-value of totally opened lens)

The current $I_9$ to be put, in the amplifier $A'_7$ through the resistance $R'_{16}$ due to the output voltage $V_3$ of the amplifier $A'_6$ is given by $$I_9 = \frac{R'_{15}}{R'_{16}} \times I_8 (\propto Avo \propto \text{F-value of totally opened lens})$$

The output voltage $V_2$ of the amplifier $A'_4$ is put in the amplifier $A'_7$ as input current $I_{10}$ through the resistance $R'_{17}$. Thus $I_{10}$ is given by;

$$I_{10} = \frac{V_2 - Vc}{R'_{17}} (\propto Bv + Sv - Tv - Avo + K \propto \text{diaphragm step number})$$

On the other hand, in the amplifier $A'_7$ the input current $I_9$ is added to $I_{10}$ and the result is given by $$I_9 + I_{10} = \frac{R'_{15}}{R'_{16}} \cdot I_8 + \frac{V_2 - Vc}{R'_{17}} (\propto Bv + Sv - Tv + K \propto \text{diaphragm value})$$

This result from the amplifier $A'_7$ is converted into current in the block $H'_2$ and supplied to the indication meter $M'_4$. At this time the meter $M'_4$ also indicates the diaphragm value information obtained in accordance with the output signal $V_2$, so that when the diode $L'_1$ lights and extinguishes the meter indicates the value not proper for the exposure. When on the other hand, the diode $L'_1$ does not light and extinguish meter indicates the diaphragm set is hardly outside of the proper range.

At the second step of the shutter release button, the current source $E'_2$ is connected and by means of the output of the comparator $CP_{2'}$ the oscillation circuit OSC' is brought in the operation so as to extinguish the alarm indication $LEDL'_1$ when $LEDL'_1$ lights and extinguishes. After then the current starts to be supplied to the magnet $M'_1$ for automatic diaphragm setting. The output $V_2$ from the processing amplifier $A'_4$ and the current $I_{13}$ from the above mentioned variable resistance $VR'_5$ is processed and put in the comparator $CP_1$. The $I_7$, $I_{13}$ being determined respectively by the resistance $R'_9$ and the variable resistance $VR'_5$, are given by $$I_7 = [(V_2 - Vc)/R'_9] (\propto \text{diaphragm step number})$$

$$I_{13} = (Vc/VR'_5) (\propto \text{diaphragm step number of lens})$$

Therefore, the sum of the currents $I_7$ and $I_{13}$ is put in the comparator $CR'_1$. The value of this sum is given by;

$$I_7 + I_{13} = [(V_2 - Vc)/R'_9] + (Vc/VR'_5)$$

whereby $VR'_3$ is variable by means of the sector gear 130.

When the sum $(I_7 + I_{13})$ is larger than 0, the comparator $CP'_1$ is brought in the switched on state, supplying a constant current $I_{12}$ to the electromagnet $M'_1$.

When the sum $(I_7 + I_{13})$ is smaller than or equal to 0, the comparator $CP'_1$ is brought in the switched off state, interrupting the current supply to the electromagnet. Thus the engaging lever 138 engages with the gear 137 in such a manner that the diaphragm is set at the proper value as mentioned above.

In case the above processing is carried in Apex process, the signal from the information resistance is given by $$I = (Vc/VR')C \text{ (VR' : set resistance value of VR'}_1 = VR'_5),$$

so that when the resistance value for the variation of the resistance value is chosen $R' = (Ro'/\theta)$, I is given by $$I = (Vc/Ro') \times \theta$$

whereby the output signal is linearly proportional to the variation of the exposure information to be set, for example the shutter time, the ASA sensitivity. In case the external control terminals $T'_1$ and $T'_2$ are used (in case of speed light, external light sensing), a voltage is applied to the terminal $R'_1$ whereby $A'_2$ is brought in the switched off state while $A'_5$ is brought in the switched on state in such a manner that the information processing system is switched over for the external control. Further the diaphragm control signal is given from $T'_2$. In this case, the diaphragm control signal and the F-number signal are processed in the processing amplifier so as to produce the output $V_2$.

The operations after this are same as mentioned before and therefore the explanations for them are omitted.

Figures 14, 15:
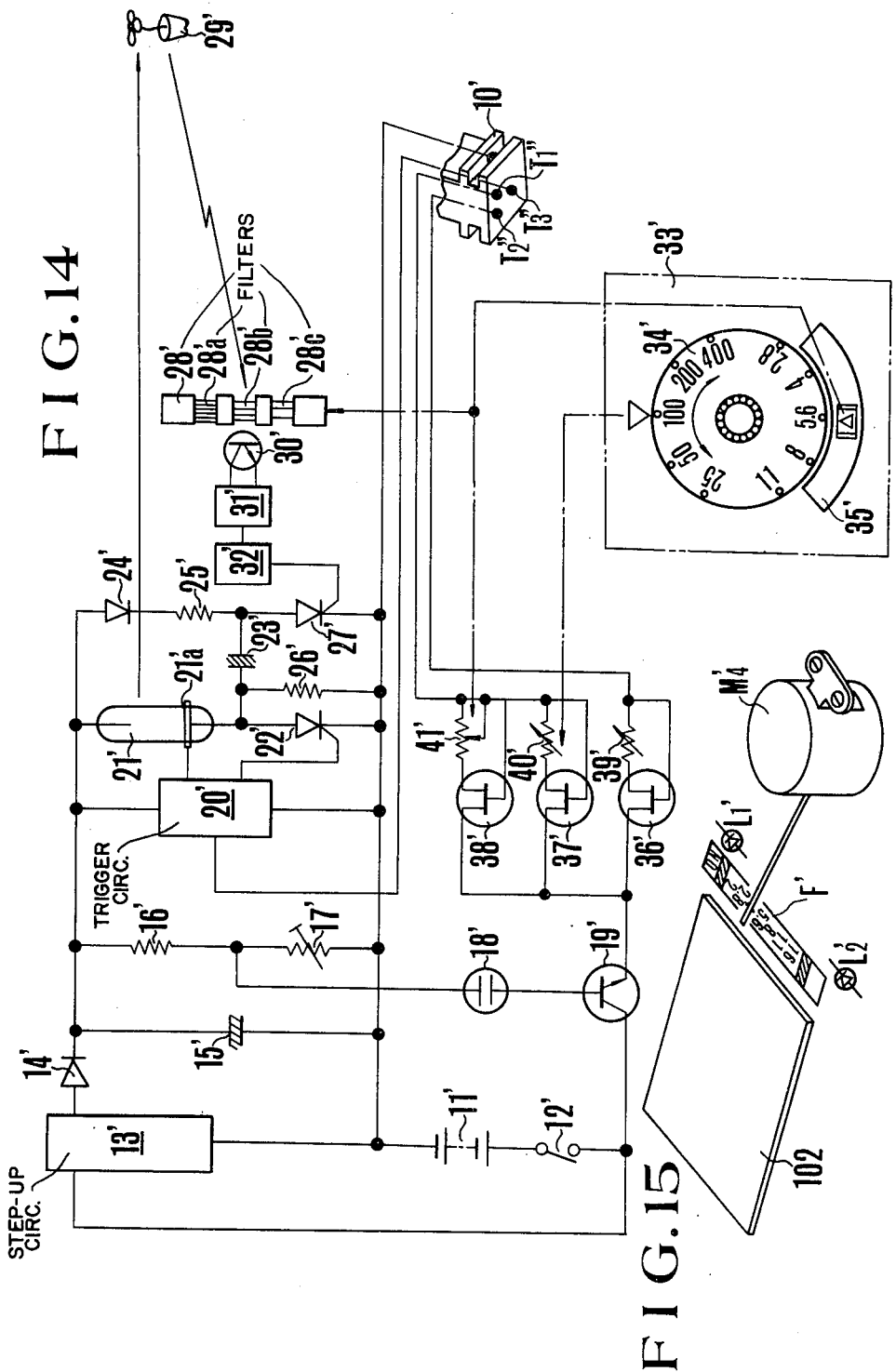
FIG. 14 shows the circuit diagram of an embodiment of the flash light device to be used in the camera system shown in FIGS. 11 to 13.
FIG. 15 shows the view finder indication part of the camera system shown in FIG. 11 to FIG. 13.

FIG. 14 shows the flash light device. In the drawing, 10' is the foot to be mounted in the accessary shoes, whereby on this foot the terminals $T''_1$, $T''_2$ and $T''_3$ to be brought in contact with $T'_1$, $T'_2$ and $T'_3$ at the camera side are provided. 11' is the current source, 12' the current source switch, 13' the voltage step up circuit for the current source, 14' the rectifying diode, 15' the main condenser being connected with the output terminal of the diode 14', 16' and 17' the resistance for forming a detecting circuit for detecting the terminal voltage of the main condenser 15'. 18' the neon tube being connected with the connecting point of the resistance 16' and 17', 19' is the transistor with base electrode connected with the neon tube 18', and 20' the conventional trigger circuit for producing trigger pulse, whereby the output of the trigger circuit 20' is connected with the gate electrode of the silicon controlled rectifier (SCR) connected with the trigger electrode 21a' of the discharge tube 21' for producing flash light and the discharge route of the discharge tube 21'. 23' is the condenser, 24' the diode, 25' and 26' the resistances, whereby the charge route of the condenser 23' consists of the diode 24' and the resistances 25' and 26'. 27' is the SCR connected in the discharge route of the condenser 23', 28' the filter group for setting diaphragm value, consisting of filters 28a', 28b' and 28c' presenting different permeabilities, whereby the filters are provided on the front surface of the light sensing element 30' receiving the light beam reflected on the object 29' to be photographed from the discharge tube 21'. 31' is the integrating circuit for integrating the photoelectric current from the light sensing element and producing the flash light stop signal as soon as the total sum of the photoelectric current reaches a certain predetermined value, 32' is the amplifier connected with the output of the integrating circuit 31' whereby the output terminal of the amplifier 32' is connected with the gate electrode of the above mentioned SCR 27'. 33' in the dotted line is the guide number setting part, whereby this guide number setting part presents a rotatable film sensitivity setting plate 34' on which a graduated scale is provided. The scale on this setting plate 34' is so designed as to correspond with the index. Further on this setting plate 34', the diaphragm value scale is provided in such a manner that the index on the movable diaphragm value setting plate 35' can be coincided with the diaphragm value scale. 36', 37' and 38' are the field effect transistors, 39' the resistance, 40' and 41' the variable resistances whereby 40' is adjusted by the rotation amount of the film sensitivity setting plate 34'. Further the variable resistance 41' is adjusted by the moving amount of the diaphragm value setting plate 35', while this diaphragm value setting plate 35' is so designed as to make the filter group 28' slide in accordance with the moving amount of the setting plate 35'.

Below the operation of this flash light device will be explained.

When the flash light device is mounted on the camera, the terminals $T'_1$, $T'_2$ and $T'_3$ of the accessary shoe come in touch with the terminals $R''_1$, $T''_2$ and $T''_3$ of the mounting foot 10'. When then the current source switch 12' is closed, the voltage of the current source 11' is stepped up and applied to the main condenser 15'. Thus the voltage at both terminals of the main condenser 15' rises up gradually in such a manner that as soon as the voltage at both terminals of the main condenser 15' reaches a charge completion voltage the neon tube 18' is brought in the conductive state so as to bring the transistor 19' in the switched on state. Thus the current is supplied to the illumination diode $L'_2$ through the terminals $T''_2$, $T'_2$ so as to make the diode $L'_2$ illuminate. Thus it is indicated that the main condenser 15' is charged up to the charge completion voltage. When then as the film sensitivity the scale 100 on the film sensitivity setting plate 34' is coincided with the index, the resistance of the film sensitivity setting variable resistance 40' assumes a value corresponding to the film sensitivity 100.

When then the index of the diaphragm setting plate 35' is coincided with the diaphragm value scale, for example 5.6, the filter group 28' slides in front of the light sensing element 30' in such a manner that at last the filter 28b' corresponding to the diaphragm value F 5.6 is arranged in front of the light sensing element 30', while the diaphragm setting variable resistance 39' assumes the value corresponding to the diaphragm value $F = 5.6$ set by the setting plate 35'. Now let the current in the variable resistance 41' be ia and the current in the variable resistance 40' be ib, so the current (ia + ib) namely the signal current $I_{11}$ is put in the accessary shoe through the terminal $T''_1$ so as to drive the meter $M'_4$. When now the shutter release button 7' is push down the shutter is driven similarly to the case of the shutter time for flash light. Simultaneously with the opening operation of the shutter the synchronizing switch $S'_9$ is closed. Thus a signal is put in the trigger circuit 20' so as to produce trigger pulse for the discharge tube 21' as well as SCR 22'. In this way, the charge stored in the main condenser 15' is discharged through the discharge tube 21' and SCR 22' so that the discharge tube 21' produces a flash light. When later the flash light stop signal is produced by the integrating circuit 31', the SCR 27' is brought in the switched on state so that SCR 22' is brought in the non conductive state and the discharge tube 21' stops. After the elapse of a certain determined time, the shutter closes so as to terminate taking photograph under flash light obtaining a proper exposure.

FIG. 15 shows the finder indication part. In the drawing 102 is the focussing plate, $M'_4$ the meter, F' the diaphragm value indication plate, $L'_1$ and $L'_2$ the illumination diodes. The illumination diode $L'_2$ lights at the completion of the charge of the flash light device to indicate the charge completion. Further the flash light device operates while the mirror is raised, whereby the diode $L'_2$ extinguishes once so as to indicate the photographer that the flash light device has duly operated. L'₁ is the LED illumination diode which lights and extinguishes when the photographic condition is outside of the settable range so as to indicate the alarm, whereby the diode L'₁ works at the time of taking photograph under day light and under flash light equally. The reason why the embodiment shown in the drawing is so designed that the absolute diaphragm value information put in the camera side from the flash light device is once connected in the step number value and again recorrected in the absolute value so as to drive the meter, is to drive this L'₁, while it is possible to so design that the information of the absolute value is directly put in the meter driving circuit without being converted in the step number value.

As explained above, in accordance with the present invention the meter (M'₄) as the diaphragm deciding device is connected with the processing circuit as is shown in FIG. 13, so that at taking photograph under day light at first the diaphragm step number value for obtaining the proper exposure is processed out of the output of the light sensing element of the TTL totally opened light sensing system and then added to the F-value information of the totally opened photographic lens into the absolute diaphragm value, by means of the driving current corresponding to which absolute diaphragm value the pointer finger is displaced in such a manner that in cooperation with the diaphragm value indication plate F' being arranged in the view finder optical path as shown in FIG. 15 and presenting the diaphragm value scale the photographer can read the absolute diaphragm value. Further, at the time of taking photograph under the flash light by means of a signal from the flash light device as shown in FIG. 14 the processing circuit at the camera side is switched over into another state in such a manner that by means of the driving current corresponding to the designated absolute diaphragm value information put in the flash light device the photographer can read the absolute diaphragm value similarly to the time of taking photograph under day light.

Further, the amplifier A'₈ of the above mentioned block H'₂ and the transistors Tr'₁, Tr'₂ and Tr'₃ control the output of the transistor Tr'₁ by means of the output of A'₈ in such a manner that the output of the above mentioned amplifier A'₇ is put in the one input terminal of the amplifier A'₈ whereby the output Tr'₁ is negatively fed back to the other input terminal of the amplifier A'₈ while the diode-coupled transistor Tr'₂ is connected to the output circuit of the transistor Tr'₁ and the meter M'₄ is connected in forward direction to the output circuit of the transistor Tr'₃ being connected so as to be controlled by the voltage compressed by the transistor Tr'₂, through the non-return diode D'₃ so as to indicate the processed output as mentioned above. At the same time, the checker switch S'₈ and the voltage dividing resistance R'₂₀ is connected in series with the connecting point of the meter M'₄ and the diode D'₃ in such a manner that by closing the switch S'₈ the meter M'₄ is also used for indication the clock of the current source. Thus the indication by the meter M'₄ is carried out as follows. When the output processed by the amplifier A'₇ is supplied to the one input terminal of the amplifier A'₈, the output of the emitter of the load transistor is negatively fed back to the other input terminal of the amplifier A'₈ so that the terminal voltage of the resistance is always equal to the output voltage of the amplifier A'₇. Thus the emitter current of the transistor Tr'₁ assumes the value (output voltage of the amplifier)/R'₁₉ so that a current almost equal to this flows between the collector and the emitter of the transistor Tr'₁. This current is regenerated as the current flowing between the collector and the emitter of the transistor Tr'₃ through the transistors Tr'₂ and Tr'₃ and supplied to the meter M'₄ through the diode D'₃ for indication.

At the time checking the current source, by closing the switch S'₈ the current flows from the current source E to the meter M'₄ so that the current source E can be checked. Hereby R'₂₁ is a dummy resistance.

Figure 16:
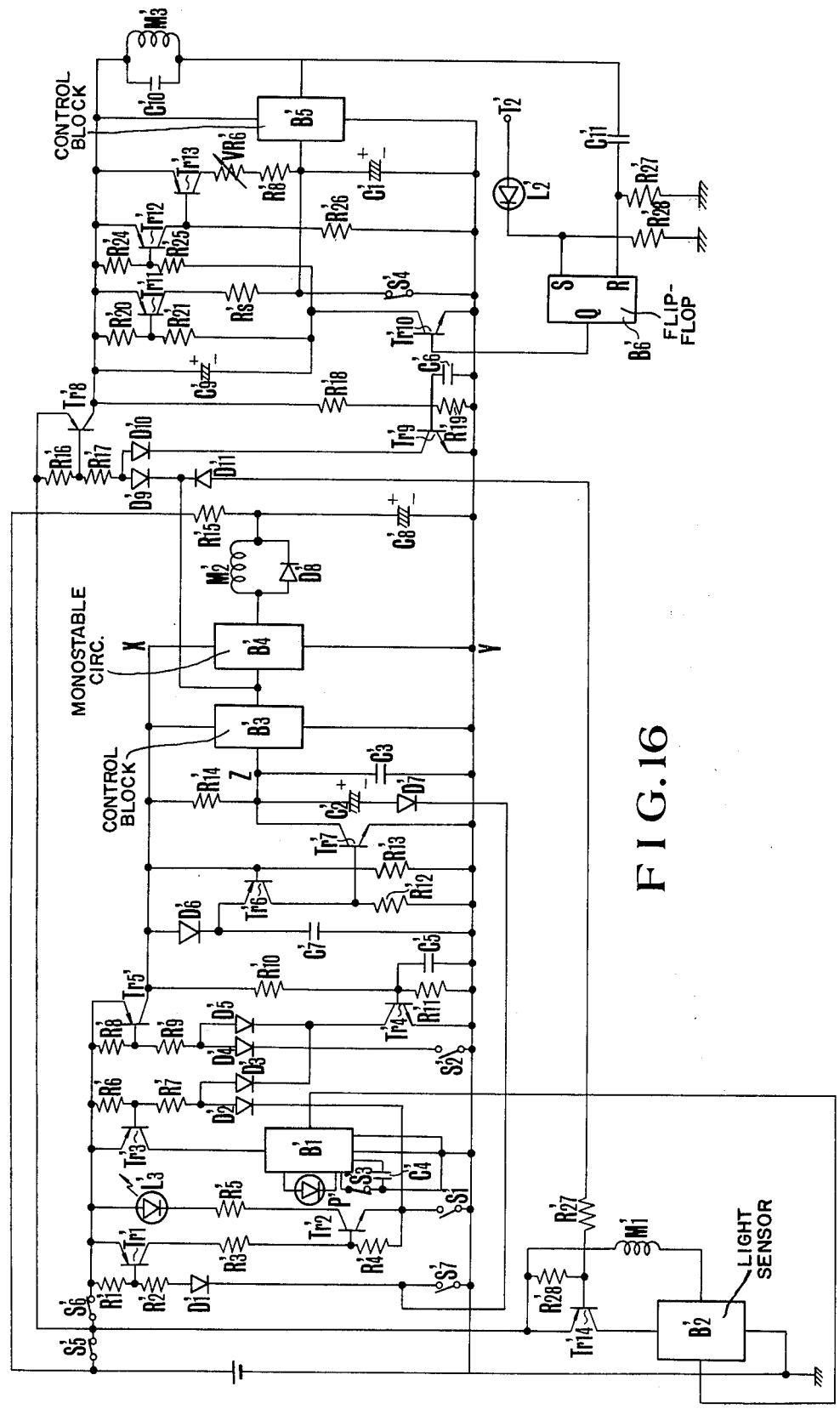
FIG. 16 shows a variation of the circuit diagram shown in FIG. 12.

FIG. 16 shows further other variation in accordance with the present invention. The composition is almost identical with that shown in FIG. 12. However, hereby a flip-flop circuit B'₆ which is set by the input at the terminal T'₂ and reset by the output of the block B'₈ is further connected in such a manner that the transistor Tr'₁₀ is brought in the switched on state by means of the set output.

The block B'₆ is connected so as to bring the transistor Tr'₁₀ in the switched on state by means of its set output signal so that the transistor Tr'₁₀ is kept in the switched on state until the shutter closes by means of the excited electromagnet M'₃. Thus even when the charge completion signal extinguishes by the operation of the flash light device, there is no danger for misoperation in the shutter time.

Figure 17:
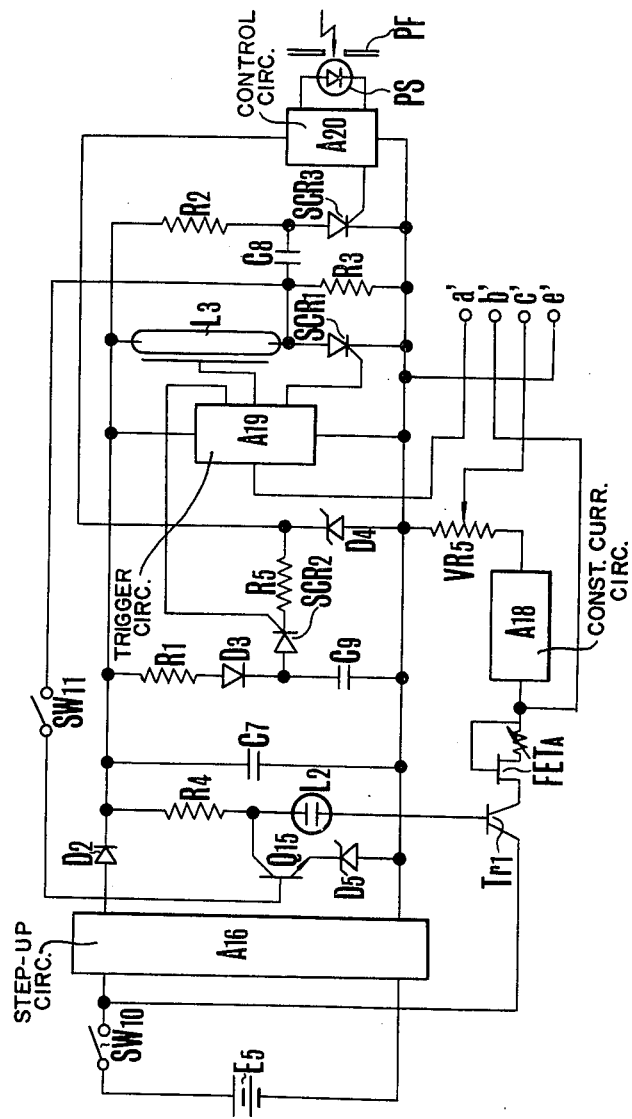
FIG. 17 shows a circuit diagram of another embodiment of the flash light device shown in FIG. 10.

FIG. 17 shows the circuit diagram of further another embodiment of the flash light device shown in FIG. 10. Hereby the composition is nearly identical with that shown in FIG. 10, the components bearing the same figures as in FIG. 10. The switching circuit shown in FIG. 10 is composed of a constant current circuit consisting of the transistor $Tr_A$ and $FET_A$ as shown in the drawing, in such a manner that when the main condenser $C_1$ is charged up to the determined potential and the transistor $Tr_A$ is brought in the switched on state, a constant current flows in the charge completion indication illumination diode shown in FIG. 6 so as to keep the brightness of the illumination diode always constant and at the same time to prevent the flow of a large current when a short circuit takes place between the terminals b' and e'.

Figure 18:
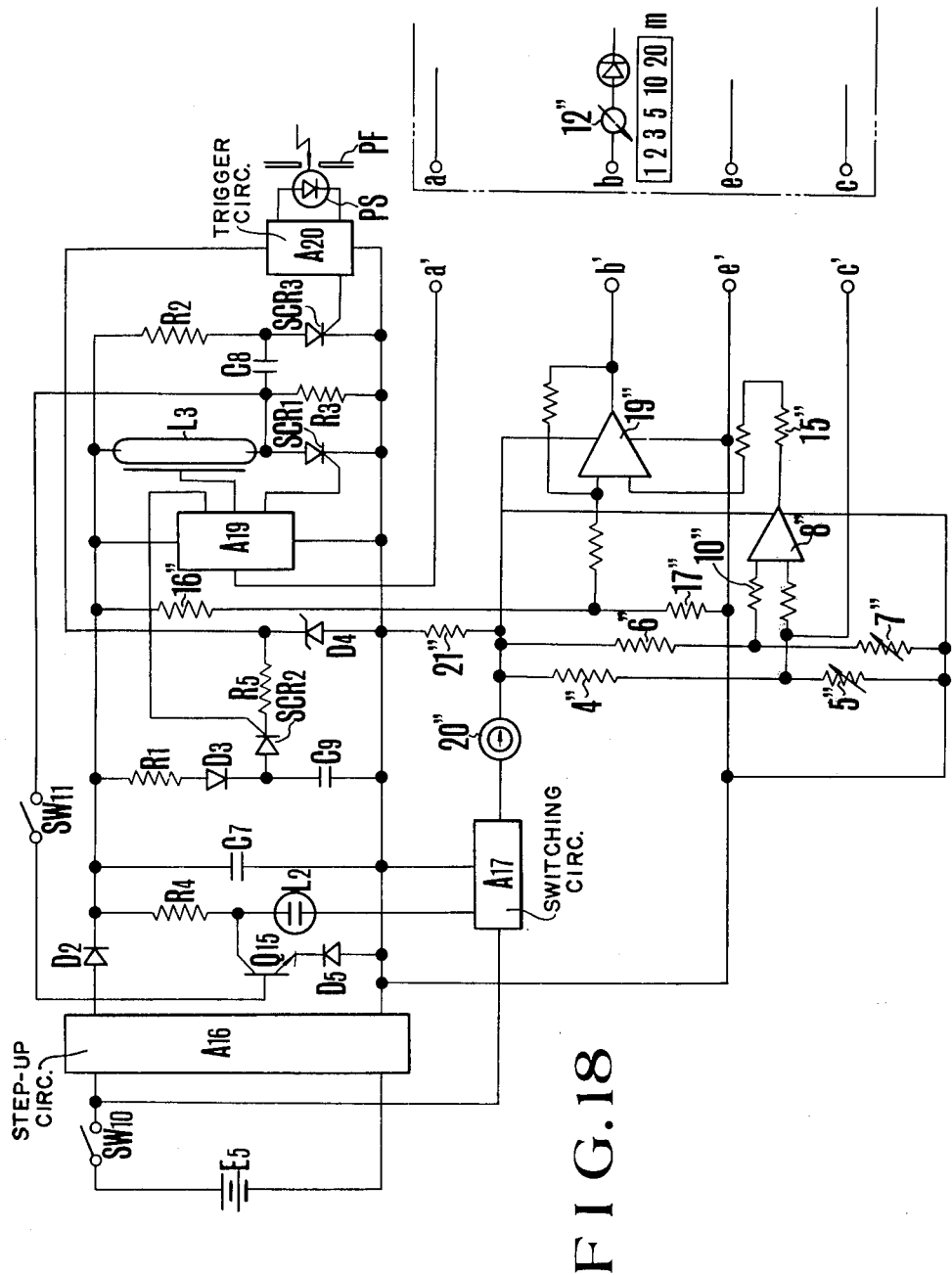
FIG. 18 shows the circuit diagram of further another embodiment of the flash light device shown in FIG. 10.

FIG. 18 shows the circuit diagram of further another embodiment of the flash light device shown in FIG. 10, whereby the same components bear the same figures as those in FIG. 10. The current is supplied to the amplifier 19" from the switching circuit A₁₇ through a constant current circuit 20", the charge voltage of the main condenser is divided by the resistances 16" and 17" so as to be applied to the one input terminal of the amplifier 19" while the amplifier 8" is provided in such a manner that the voltage of the current source is divided by the diaphragm value setting variable resistance 5" and the film sensitivity setting resistance 7" as information so as to be applied to the input terminal of the amplifier 8" whereby the output of the amplifier 8" which has processed the diaphragm value and the film sensitivity is applied to the one input terminal of the amplifier 19" in such a manner that the amplifier 19" processes the processed result of the above mentioned diaphragm value and the above mentioned film sensitivity together with the flash light energy information (GHo) put in through the voltage dividing resistances 16" and 17" so as to produce an information for showing the distance range for obtaining a proper exposure, which range is shown by means of the meter 12" at the camera side through the output terminal *b'*. The information at the terminal *b'* appears only when the main condenser $C_7$ is charged up to a certain determined value so that the information is shown by the indication circuit such as illumination diode at the camera side as the charge completion signal as explained in accordance with FIG. 10 and later is used as the control signal at the camera side as explained in detail in accordance with FIG. 1.

As explained above in detail in accordance with the camera system of the present invention the diaphragm of the camera is automatically controlled down to the determined value at taking photograph under flash light, the shutter time is also switched over for taking photograph under flash light and the indication system is also switched over for taking photograph under flash light. In other words, it is sufficient for the photographer to mount the flash light device on the camera in order that all the control circuits are automatically controlled so as to be switched over for the flash light photographic mode so that it can be said as the camera system for taking photograph under flash light very profitable.

What is claimed is:

1. A flash camera system, comprising:
   A. A flash device, having:
      a. a flash discharge tube,
      b. energy accumulation means connected to said discharge tube for accumulating energy to energize the flash discharge tube,
      c. accumulation completion signal forming means connected to said energy accumulation means for forming an energy accumulation completion signal when the energy accumulated at said energy accumulation means reaches a prescribed level,
      d. diaphragm information forming means to form a diaphragm information signal corresponding to a constant diaphragm aperture value prescribed for flash photography, and
      e. a flash control circuit coupled to said discharge tube to control the amount of light from said flash discharge tube on the basis of data depending on the distance to an object, and
   B. a camera, including an objective having a diaphragm defining an exposure opening, and automatic means coupled to the diaphragm for setting the diaphragm aperture to the prescribed aperture value in response to the energy accumulation completion signal at a time of flash photography, said automatic means including;
      a. exposure opening control means coupled to said diaphragm to control the exposure opening,
      b. an exposure opening control circuit coupled to said exposure opening control means, said circuit having a flash control mode which controls the exposure opening control means based on said prescribed diaphragm aperture value information signal, and
      c. a designating circuit connected to said exposure opening control circuit and responding to said energy accumulation completion signal by forming a mode designation signal for setting said exposure opening control circuit to the flash control mode so that the exposure opening control circuit is automatically set to the flash control mode.

2. A camera system according to claim 1, in which said camera further includes a shutter, and;
   a. shutter control means settable to an ordinary mode and a flash mode for setting the shutter to the shutter time prescribed for flash photography, and
   b. a shutter mode selection circuit which is connected to said shutter control means and to said accumulation completion signal for setting the shutter control means into the flash photography mode.

3. A camera system according to claim 2, in which holding means connected to said accumulation completion signal forming means and said shutter mode selection circuit hold said accumulation completion signal.

4. A camera system according to claim 3, in which said holding means is reset in correspondence with the shutter closing signal from said shutter mode selection circuit.

5. A camera system according to claim 4, in which said holding means is a flip-flop circuit set by said accumulation completion signal and reset by the shutter closing signal.

6. A camera system according to claim 1, in which said prescribed diaphragm information forming means is connected to said accumulation completion signal forming means and is activated in response to the energy accumulation completion signal.

7. A camera system according to claim 1, in which said camera includes:
   a. an indicating circuit connected to said exposure opening control circuit to indicate the output of said control circuit.

8. A camera system according to claim 1, in which said camera has an indication means to indicate the accumulation completion signal.

9. A camera system according to claim 8, wherein said camera includes a warning circuit responding to the output of said exposure opening control circuit and exhibiting a prescribed operating level and for activation when the output of said exposure opening control circuit and said operating level have a prescribed relationship.

10. A camera system according to claim 9, wherein said warning circuit includes an oscillator and an indicator connected to said oscillator.

11. A flash camera system, comprising:
    A. a flash device, having:
       a. a flash discharge tube,
       b. energy accumulation means connected to said discharge tube for accumulating energy to energize the flash discharge tube,
       c. accumulation completion signal forming means connected to said energy accumulation means for forming an energy accumulation completion signal when the energy accumulated at said energy accumulation means reaches a prescribed level,
       d. diaphragm information forming means to form a diaphragm information signal corresponding to a constant diaphragm aperture value prescribed for flash photography, and
       e. a flash control circuit coupled to said discharge tube to control the amount of light from said flash discharge tube based on data depending upon the distance to an object, and
    B. a camera, including and objective having a diaphragm defining an exposure opening, and automatic means coupled to the diaphragm for setting the diaphragm aperture to the prescribed aperture value in response to the energy accumulation completion signal at a time of flash photography, said automatic means including:
  a. exposure opening control means coupled to said diaphragm to control the exposre opening,
  b. a diaphragm aperture signal forming circuit to form diaphragm aperture signal to control diaphragm aperture,
  c. and exposure control circuit to control the exposure opening control means on the basis of the output of said diaphragm aperture signal forming circuit, and C. (a) a selector circuit in one of said flash device and said camera and connected to said exposure control circuit and responsive to the accumulation completion signal for automatically switching the diaphragm aperture signal to the prescribed diaphragm aperture value information signal and transmitting said prescribed diaphragm aperture value information signal to said exposure control circuit, and for controlling the exposure opening control means on the basis of the prescribed diaphragm aperture value information signal.

12. A camera system according to claim 11, in which said diaphragm aperture signal forming circuit includes a light sensing circuit which generates an output corresponding to an object brightness.

13. A camera system according to claim 11, in which said selector circuit is mounted in the flash device.

14. A camera system as in claim 11 wherein said selector circuit is mounted in the camera.

15. A camera system according to claim 11, in which said camera includes an indication circuit to indicate the output of said accumulation completion signal forming means and said flash light device includes a flash signal forming means which detects the flashing action of said flash light device and produces a flash signal and control means which places said indication circuit in an inactive state in response to the flash signal of said forming means.

16. A camera system according to claim 11 in which said camera includes and indication circuit to indicate the output of the exposure control circuit; said camera having a power source to supply power to said exposure opening control means, to said exposure control circuit, and to said indication circuit; said camera having an operating member movable to two steps to control photographing action; said camera having first switching means connecting said exposure control circuit and said indication circuit to said power source in response to movement to the first step by said operating member, said camera having second switching means which connects said exposure opening control means to power source in response to movement of the operating member to the second step, said camera having power supply disabling means for disabling the power supply to the indication circuit in response to said second switching means.

17. A camera capable of flash photography using a computer stroboscope containing a charge completion signal forming circuit to form a charge completion signal when a main capacitor is charged to a prescribed level, said camera comprising an objective and a diaphragm as well as a shutter, said camera further comprising;
  a. exposure opening control means coupled to the diaphragm to control the diaphragm exposure opening,
  b. a diaphragm information forming circuit to form diaphragm aperture information signal,
  c. a control circuit coupled to said exposure opening control means and said diaphragm information forming circuit for forming a control signal to control said exposure opening control means, said control circuit being operable in a flash mode to form a control signal corresponding to a prescribed diaphragm aperture valve during flash photography and an ordinary photographic mode to form a control signal corresponding to the output of said diaphragm aperture information forming circuit, and
  d. a selection circuit connected to said control circuit for automatically selecting the flash mode in response to the charging completion signal of said computer stroboscope, for controlling the exposure opening control means with a control signal corresponding to said prescribed diaphragm aperture value.

18. A camera system according to claim 17, in which said camera further comprises:
  a. a shutter control circuit to control the shutter, said circuit including shutter control means for flash controlling the shutter at a predetermined speed suitable for flash photography, and
  b. a shutter mode selection circuit responsive to the charge completion signal and connected to said shutter control means for activating said shutter control means in response to said charging completion signal.

19. A camera system according to claim 18, further comprising a holding circuit connected to said shutter mode selection circuit for memorizing and holding said charge completion signal.

20. A camera as in claim 17, which further comprises:
  a. means to form a diaphragm aperture signal corresponding to a controllable diaphragm aperture value of the objective lens,
  b. a comparison circuit coupled to said aperture signal forming means and said control circuit for comparing the diaphragm aperture signal corresponding to said controllable diaphragm aperture value and the control signal of said control circuit so as to form an output signal when said both signals have a prescribed relationship, and
  c. an indication means to indicate the output of said comparison circuit.

21. A flash device for use in combination with a camera including a diaphragm control device settable to an ordinary photographic mode and flash mode and controlling the aperture of a diaphragm based on the output of a light sensing circuit, said flash device comprising:
  a. a flash discharge tube,
  b. accumulation means to accumulate flash energy for said flash discharge tube,
  c. accumulation completion signal forming means coupled to said accumulation means to form an accumulation completion signal when the flash energy accumulated at said accumulation means reaches a prescribed level,
  d. flash control circuit coupled to said tube to control the amount of flashing by said flash discharge tube based on the distance to an object, p1 e. informatiom forming means for forming a diaphragm aperture information signal corresponding to a constant diaphragm aperture value prescribed for flash photography, f. a signal transmission terminal connected to said accumulation completion signal forming means and transmitting said accumulation completion signal to said diaphragm aperture control device for setting the diaphragm aperture control device to the flash mode, and g. a second signal transmission terminal connected to said diaphragm aperture information forming means to transmit the aperture information signal to said diaphragm control device.

22. A flash device according to claim 21, in which said diaphragm information forming means contains a means to vary the prescribed diaphragm information.

23. A flash device according to claim 21 further comprising:

a. a flash energy level output means connected to said accumulation means to produce information corresponding to the level of the flashing energy, b. an exposure factor information forming circuit to generate an output corresponding to an exposure factor, c. a computation circuit connected to said flash energy level output means and said exposure factor information forming circuit to compute a distance to an object in which proper flash light photography can be performed on the basis of said flash energy level and said exposure factor, and d. indication means coupled to said computation circuit to indicate the output of said computation circuit.

24. A flash camera system, comprising:

A. a flash light device, having:

a. a flash discharge tube, b. flash energy accumulation means connected to said flash discharge tube to accumulate flash energy, c. accumulation completion signal forming means connected to said flash energy accumulation means to form a flashing energy accumulation completion signal when the flash energy accumulated at said flash energy accumulation means reaches a prescribed level, and d. prescribed diaphragm information forming means to form a prescribed diaphragm aperture value information signal corresponding to a constant diaphragm aperture value prescribed for flash photography, and B. a camera having: p2 a. a light sensing circuit to form an output corresponding to an object brightness, b. diaphragm control circuit coupled to said light sensing circuit and to said aperture information forming means and having an ordinary photographic mode control circuit to form the diaphragm aperture control signal for controlling diaphragm aperture based on the output of said light sensing circuit and a flash photographing mode control circuit to form diaphragm control signal for controlling the diaphragm aperture based on the output of said prescribed aperture information forming means, c. a mode selector means connected to said diaphragm control circuit for setting said flash mode control circuit in an active state in response to said flashing energy accumulation completion for forming a mode control signal to set said ordinary photographing mode control circuit in an inactive state so that the diaphragm is automatically controlled by said flash photographing mode control circuit, and d. diaphragm control means coupled to said diaphragm control circuit to control the diaphragm aperture based on the output of said diaphragm control circuit.

25. A system as in claim 24, wherein said camera includes:

a. a shutter circuit to control shutter circuit, said circuit having a shutter control means to control a shutter with the shutter time prescribed for flash photography, and b. a shutter mode selection circuit connected to said shutter control means and responds to said accumulation completion signal for setting the shutter control means in an active state.

26. A camera system as in claim 25, wherein said mode selection circuit includes a first switching circuit connected to said ordinary photographic mode control circuit and a second switching circuit connected to said flash mode control circuit, said first switching circuit producing a signal for setting the ordinary photographic mode control circuit in an inactive state in response to said accumulation completion signal, said second switching circuit producing a signal for setting the flash mode control circuit in an active state.

27. A camera for use with a computer stroboscope including accumulation means to accumulate flash energy and accumulation completion signal forming means to form an accumulation completion signal when the flash energy accumulated at said accumulation means reaches a prescribed level, said camera comprising a diaphragm and a shutter, and further comprising a. exposure opening control means to control said diaphragm, b. a light sensing circuit to form an output corresponding to object brightness, c. a diaphragm control circuit coupled to said exposure opening control means, wherein said circuit including an ordinary diaphragm control mode circuit to control said exposure opening control means based on the output of said light sensing circuit and a flash diaphragm control mode circuit to control said exposure opening control means based on a prescribed diaphragm aperture value, d. a shutter time control circuit, including an ordinary photographing shutter control mode circuit to control the shutter with a set shutter time and a flash photographing shutter control mode circuit to control the shutter with a shutter time prescribed for flash photography, e. a diaphragm mode selection circuit connected to said diaphragm control circuit for selecting the flash diaphragm control mode circuit in response to said accumulation completion signal so as to control the diaphragm with said diaphragm control mode circuit, and f. a shutter mode selection circuit connected to said shutter control circuit for selecting the flash shutter control mode circuit in response to said accumulation completion signal so as to control the shutter with said shutter control mode circuit.

* * * * *